US012239953B2

(12) United States Patent
Mennell et al.

(10) Patent No.: US 12,239,953 B2
(45) Date of Patent: Mar. 4, 2025

(54) BIOGENIC POROUS CARBON SILICON DIOXIDE COMPOSITIONS

(71) Applicant: Carbon Technology Holdings, LLC, Oakdale, MN (US)

(72) Inventors: James A Mennell, Brighton, UT (US); Daniel J. Despen, Oakdale, MN (US); Dustin Slack, Oakdale, MN (US)

(73) Assignee: Carbon Technology Holdings, LLC, Oakdale, MN (US)

( * ) Notice: Subject to any disclaimer, the term of this patent is extended or adjusted under 35 U.S.C. 154(b) by 910 days.

(21) Appl. No.: 17/250,179

(22) PCT Filed: Jun. 13, 2019

(86) PCT No.: PCT/US2019/036881
§ 371 (c)(1),
(2) Date: Dec. 9, 2020

(87) PCT Pub. No.: WO2019/241463
PCT Pub. Date: Dec. 19, 2019

(65) Prior Publication Data
US 2021/0220801 A1    Jul. 22, 2021

Related U.S. Application Data

(60) Provisional application No. 62/685,126, filed on Jun. 14, 2018.

(51) Int. Cl.
B01J 20/20    (2006.01)
B01J 20/10    (2006.01)
B01J 20/28    (2006.01)
B01J 20/30    (2006.01)

(52) U.S. Cl.
CPC ............. B01J 20/20 (2013.01); B01J 20/103 (2013.01); B01J 20/28004 (2013.01); B01J 20/28011 (2013.01); B01J 20/3007 (2013.01); B01J 20/3028 (2013.01); B01J 20/3078 (2013.01); B01J 2220/42 (2013.01)

(58) Field of Classification Search
CPC .... B01J 20/20; B01J 20/103; B01J 20/28004; B01J 20/28011; B01J 20/3007; B01J 20/3028; B01J 20/3078; B01J 2220/42
USPC ........................................................ 502/413
See application file for complete search history.

(56) References Cited

U.S. PATENT DOCUMENTS

| 1,609,097 | A | 11/1926 | Stafford |
| 1,662,357 | A | 3/1928 | Barton et al. |
| 2,289,917 | A | 7/1942 | Lambiotte |
| 2,448,223 | A | 8/1948 | Lantz |
| 2,475,767 | A | 7/1949 | Williams et al. |
| 2,577,730 | A | 12/1951 | Benedict et al. |
| 2,973,306 | A | 2/1961 | Chick et al. |
| 2,988,442 | A | 6/1961 | Tanner |
| 3,088,983 | A | 5/1963 | Rosenthal |
| 3,235,374 | A | 2/1966 | Mahony |
| 3,290,894 | A | 12/1966 | Tsao |
| 3,298,928 | A | 1/1967 | Esterer |
| 3,650,711 | A | 3/1972 | Unick et al. |
| 3,852,048 | A | 12/1974 | Pyle |
| 3,853,498 | A | 12/1974 | Bailie |
| 3,928,023 | A | 12/1975 | Claflin |
| 4,002,565 | A | 1/1977 | Farrell et al. |
| 4,011,129 | A | 3/1977 | Tomlinson |
| 4,015,951 | A | 4/1977 | Gunnetman |
| 4,026,678 | A | 5/1977 | Livingston |
| 4,082,694 | A | 4/1978 | Wennerberg |
| 4,102,653 | A | 7/1978 | Simmons et al. |
| 4,149,994 | A | 4/1979 | Murty |
| 4,152,119 | A | 5/1979 | Schulz |
| 4,158,643 | A | 6/1979 | Sinha |

(Continued)

FOREIGN PATENT DOCUMENTS

| CA | 2740225 | 5/2010 |
| CA | 2806344 | 2/2012 |

(Continued)

OTHER PUBLICATIONS

Gonzalez et al., "Pyrolysis of various biomass residues and char utilization for the production of activated carbons," J. Anal. Appl. Pyrolysis, 85:134-141 (epublication date: Dec. 3, 2008).
Ikuo Abe, "Sumino Kyuchaku no Himitsu" (Secret of Adsorption of Charoal), Rinsan Shi Dayori, p. 5-9 (Dec. 1995) with English summary.
International Search Report and Written Opinion dated Nov. 6, 2023 for International Application No. PCT/US2023/15148, 13 pages.

(Continued)

Primary Examiner — Edward M Johnson
(74) Attorney, Agent, or Firm — Perkins Coie LLP

(57) ABSTRACT

Provided are biogenic porous carbon silicon dioxide compositions, as well as related compositions, and methods of making and using such compositions. Exemplary biogenic porous carbon silicon dioxide compositions include a high-carbon biogenic reagent composition that contains at least about 50 wt % total carbon, at most about 5 wt % hydrogen, at most about 1 wt % nitrogen, at most about 0.5 wt % phosphorus, at most about 0.2 wt % sulfur, at most about 0.02 wt % titanium, at most about 0.5% calcium, at most about 0.1% aluminum, and silicon dioxide. The total carbon can be biogenic carbon, and the silicon dioxide can be contained within river rock or silica fume. Also provided are processes for producing such compositions, where the processes can include: preheating a renewable feedstock, pyrolyzing the renewable feedstock, separating certain pyrolysis products, cooling solid pyrolysis products, and introducing silicon dioxide at a certain point in process.

14 Claims, 14 Drawing Sheets

(56) References Cited

U.S. PATENT DOCUMENTS

| | | |
|---|---|---|
| 4,201,831 A | 5/1980 | Slusarczuk et al. |
| 4,210,423 A | 7/1980 | Yan |
| 4,236,897 A | 12/1980 | Johnston |
| 4,246,024 A | 1/1981 | Price-Falcon et al. |
| 4,248,839 A | 2/1981 | Toomey |
| 4,255,129 A | 3/1981 | Reed et al. |
| 4,308,033 A | 12/1981 | Gunnennan |
| 4,310,334 A | 1/1982 | Waldron |
| 4,317,703 A | 3/1982 | Bowen et al. |
| 4,322,222 A | 3/1982 | Sass |
| 4,324,561 A | 4/1982 | Dean et al. |
| 4,385,905 A | 5/1983 | Tucker |
| 4,395,265 A | 7/1983 | Reilly et al. |
| 4,398,917 A | 8/1983 | Reilly |
| 4,405,331 A | 9/1983 | Blaustein et al. |
| 4,494,962 A | 1/1985 | Christie et al. |
| 4,500,327 A | 2/1985 | Nishino |
| 4,529,407 A | 7/1985 | Johnston et al. |
| 4,532,227 A | 7/1985 | Suggitt |
| 4,553,978 A | 11/1985 | Yvan |
| 4,561,860 A | 12/1985 | Gulley et al. |
| 4,632,731 A | 12/1986 | Bodle et al. |
| 4,652,433 A | 3/1987 | Ashworth et al. |
| 4,679,268 A | 7/1987 | Gurries et al. |
| 4,810,255 A | 3/1989 | Fay, III et al. |
| 4,810,446 A | 3/1989 | Sylvest |
| 4,828,573 A | 5/1989 | Jelks |
| 4,834,777 A | 5/1989 | Endebrock |
| 4,855,276 A | 8/1989 | Osborne et al. |
| 4,886,519 A | 12/1989 | Hayes et al. |
| 4,891,459 A | 1/1990 | Knight et al. |
| 4,935,099 A | 6/1990 | Weiss et al. |
| 5,132,259 A | 7/1992 | Curnutt |
| 5,141,526 A | 8/1992 | Chu |
| 5,153,242 A | 10/1992 | Timm et al. |
| 5,167,797 A | 12/1992 | Ou |
| 5,187,141 A | 2/1993 | Jha et al. |
| 5,231,063 A | 7/1993 | Fukumoto et al. |
| 5,248,413 A | 9/1993 | Stencel et al. |
| 5,336,835 A | 8/1994 | McNamara |
| 5,338,441 A | 8/1994 | LeViness |
| 5,342,418 A | 8/1994 | Jesse |
| 5,346,876 A | 9/1994 | Ichimura et al. |
| 5,352,252 A | 10/1994 | Tolmie |
| 5,403,548 A | 4/1995 | Aibe et al. |
| 5,431,702 A | 7/1995 | Schulz |
| 5,458,803 A | 10/1995 | Oehr |
| 5,513,755 A | 5/1996 | Heavilon et al. |
| 5,584,970 A | 12/1996 | Schmalfeld et al. |
| 5,643,342 A | 7/1997 | Andrews |
| 5,725,738 A | 3/1998 | Brioni et al. |
| 5,910,440 A | 6/1999 | Grossman et al. |
| 5,916,826 A | 6/1999 | White |
| 5,976,373 A | 11/1999 | Trocciola et al. |
| 5,980,595 A | 11/1999 | Andrews |
| 6,039,774 A | 3/2000 | McMullen et al. |
| 6,057,262 A | 5/2000 | Derbyshire et al. |
| 6,084,139 A | 7/2000 | Van Der Giessen et al. |
| 6,114,280 A | 9/2000 | Stephens |
| 6,342,129 B1 | 1/2002 | Vaughn et al. |
| 6,395,926 B1 | 5/2002 | Holtzapple et al. |
| 6,402,813 B2 | 6/2002 | Monereau et al. |
| 6,447,437 B1 | 9/2002 | Lee et al. |
| 6,506,223 B2 | 1/2003 | White |
| 6,524,354 B2 | 2/2003 | Sinha et al. |
| 6,698,724 B1 | 3/2004 | Traeger et al. |
| 6,712,606 B2 | 3/2004 | Hagstrom et al. |
| 6,719,816 B2 | 4/2004 | Barford |
| 6,797,034 B2 | 9/2004 | Sugitatsu et al. |
| 6,818,027 B2 | 11/2004 | Murcia |
| 6,843,831 B2 | 1/2005 | Kleut et al. |
| 6,901,868 B2 | 6/2005 | Hornung et al. |
| 7,241,321 B2 | 7/2007 | Murcia |
| 7,282,072 B2 | 10/2007 | Taulbee |
| 7,314,002 B2 | 1/2008 | Dupuis |
| 7,326,263 B2 | 2/2008 | Andersen |
| 7,332,002 B2 | 2/2008 | Johnson et al. |
| 7,354,566 B2 | 4/2008 | Okada et al. |
| 7,357,903 B2 | 4/2008 | Zhou et al. |
| 7,378,372 B2 | 5/2008 | Sylvester |
| 7,404,262 B2 | 7/2008 | Jurkovich et al. |
| 7,435,286 B2 | 10/2008 | Olson et al. |
| 7,438,785 B2 | 10/2008 | Meier et al. |
| 7,455,704 B2 | 11/2008 | Garwood |
| 7,468,170 B2 | 12/2008 | Comrie |
| 7,623,340 B1 | 11/2009 | Song et al. |
| 7,691,182 B1 | 4/2010 | Muradov |
| 7,708,806 B2 | 5/2010 | Wright et al. |
| 7,749,359 B2 | 7/2010 | Flottvik |
| 7,785,379 B2 | 8/2010 | Drisedelle et al. |
| 7,799,544 B2 | 9/2010 | Schorken et al. |
| 7,811,339 B2 | 10/2010 | Werner |
| 7,879,136 B2 | 2/2011 | Mazyck |
| 7,905,990 B2 | 3/2011 | Freel |
| 7,931,783 B2 | 4/2011 | Dam-Johansen |
| 7,932,065 B2 | 4/2011 | Medoff |
| 7,942,942 B2 | 5/2011 | Paoluccio |
| 7,943,014 B2 | 5/2011 | Berruti et al. |
| 7,960,325 B2 | 6/2011 | Kluko |
| 7,981,835 B2 | 7/2011 | Srinivasachar et al. |
| 8,048,528 B2 | 11/2011 | Matviya |
| 8,080,088 B1 | 12/2011 | Srinivasachar |
| 8,105,400 B2 | 1/2012 | Bergman |
| 8,150,776 B2 | 4/2012 | Comrie |
| 8,237,006 B2 | 8/2012 | Stone et al. |
| 8,308,911 B2 | 11/2012 | Cheiky |
| 8,309,052 B2 | 11/2012 | Jones |
| 8,328,887 B2 | 12/2012 | Yang et al. |
| 8,361,186 B1 | 1/2013 | Shearer et al. |
| 8,383,071 B2 | 2/2013 | Dillon et al. |
| 8,404,384 B2 | 3/2013 | Feaver et al. |
| 8,404,909 B2 | 3/2013 | Jadhav |
| 8,425,633 B2 | 4/2013 | Banasiak |
| 8,436,120 B2 | 5/2013 | Piskorz et al. |
| 8,449,724 B2 | 5/2013 | Stromberg et al. |
| 8,476,480 B1 | 7/2013 | Brown et al. |
| 8,519,205 B2 | 8/2013 | Frey |
| 8,541,637 B2 | 9/2013 | Babicki et al. |
| 8,563,467 B2 | 10/2013 | Hashisho et al. |
| 8,637,055 B2 | 1/2014 | Maor |
| 8,669,404 B2 | 3/2014 | Shulenberger et al. |
| 8,685,136 B2 | 4/2014 | Metius et al. |
| 8,801,936 B2 | 8/2014 | Grass et al. |
| 8,920,525 B2 | 12/2014 | Despen et al. |
| 8,920,609 B2 | 12/2014 | Steele et al. |
| 8,926,932 B2 | 1/2015 | Pfeifer et al. |
| 8,993,478 B2 | 3/2015 | Fujii et al. |
| 8,999,885 B2 | 4/2015 | Majmudar et al. |
| 9,108,186 B2 | 8/2015 | Satterfield |
| 9,121,606 B2 | 9/2015 | Srinivasachar |
| 9,281,135 B2 | 3/2016 | Soneda et al. |
| 9,388,046 B2 | 7/2016 | Mennell et al. |
| 9,388,355 B2 | 7/2016 | Mennell et al. |
| 9,475,031 B2 | 10/2016 | Mennell et al. |
| 9,527,780 B2 | 12/2016 | Wilson et al. |
| 9,724,667 B2 | 8/2017 | Mennell et al. |
| 9,725,371 B2 | 8/2017 | Shearer et al. |
| 9,752,090 B2 | 9/2017 | Despen et al. |
| 9,845,440 B2 | 12/2017 | Mennell et al. |
| 9,902,907 B2 | 2/2018 | Song et al. |
| 10,167,437 B2 | 1/2019 | Mennell et al. |
| 10,174,267 B2 | 1/2019 | Mennell et al. |
| 10,332,226 B2 | 6/2019 | Block et al. |
| 10,611,977 B2 | 4/2020 | Mennell et al. |
| 10,961,459 B2 | 3/2021 | Seidner |
| 10,982,161 B2 | 4/2021 | Mennell et al. |
| 10,995,274 B2 | 5/2021 | Marsh |
| 11,091,716 B2 | 8/2021 | Despen et al. |
| 11,285,454 B2 | 3/2022 | Mennell et al. |
| 11,286,440 B2 | 3/2022 | Mennell et al. |
| 11,413,601 B2 | 8/2022 | Despen et al. |
| 11,851,723 B2 | 12/2023 | Mennell et al. |
| 2002/0048144 A1 | 4/2002 | Sugo et al. |
| 2003/0154858 A1 | 8/2003 | Kleut et al. |

(56) References Cited

U.S. PATENT DOCUMENTS

| | | |
|---|---|---|
| 2003/0221363 A1 | 12/2003 | Reed |
| 2004/0045215 A1 | 3/2004 | Guilfoyle |
| 2004/0178052 A1 | 9/2004 | Antal |
| 2005/0095183 A1 | 5/2005 | Rehmat et al. |
| 2005/0258093 A1 | 11/2005 | Cueman et al. |
| 2005/0274068 A1 | 12/2005 | Morton et al. |
| 2005/0279696 A1 | 12/2005 | Bahm et al. |
| 2006/0048646 A1 | 3/2006 | Olson et al. |
| 2006/0120934 A1 | 6/2006 | Lanier et al. |
| 2006/0278040 A1 | 12/2006 | Harada et al. |
| 2006/0280669 A1 | 12/2006 | Jones |
| 2007/0006526 A1 | 1/2007 | Cullen |
| 2007/0034126 A1 | 2/2007 | Chen et al. |
| 2007/0125228 A1 | 6/2007 | Alizadeh-Khiavi et al. |
| 2007/0220805 A1 | 9/2007 | Leveson et al. |
| 2007/0261295 A1 | 11/2007 | Tolmie |
| 2008/0281673 A1 | 11/2008 | Davis et al. |
| 2009/0031616 A1 | 2/2009 | Agblevor |
| 2009/0056205 A1 | 3/2009 | Gauthier et al. |
| 2009/0151251 A1 | 6/2009 | Manzer et al. |
| 2009/0188160 A1 | 7/2009 | Liu |
| 2009/0205546 A1 | 8/2009 | Kluko |
| 2009/0272946 A1 | 11/2009 | Lu |
| 2009/0314185 A1 | 12/2009 | Whellock |
| 2010/0069507 A1 | 3/2010 | Tabata |
| 2010/0115841 A1 | 5/2010 | Cork |
| 2010/0139155 A1 | 6/2010 | Mennell et al. |
| 2010/0228062 A1 | 9/2010 | Babicki et al. |
| 2010/0273899 A1 | 10/2010 | Winter |
| 2010/0289270 A1 | 11/2010 | Behrens et al. |
| 2010/0300866 A1 | 12/2010 | van Aardt et al. |
| 2011/0002086 A1 | 1/2011 | Feaver et al. |
| 2011/0011721 A1 | 1/2011 | Champagne |
| 2011/0071022 A1 | 3/2011 | Bandosz et al. |
| 2011/0083953 A1 | 4/2011 | Horn |
| 2011/0099887 A1 | 5/2011 | Stinson et al. |
| 2011/0099890 A1 | 5/2011 | Bohlig et al. |
| 2011/0155019 A1 | 6/2011 | Albright et al. |
| 2011/0219679 A1 | 9/2011 | Budarin et al. |
| 2011/0287991 A1 | 11/2011 | Dubois |
| 2011/0287999 A1 | 11/2011 | Luc |
| 2011/0296745 A1 | 12/2011 | Hilten et al. |
| 2012/0021123 A1 | 1/2012 | Leveson et al. |
| 2012/0023809 A1 | 2/2012 | Koch et al. |
| 2012/0125064 A1 | 5/2012 | Joseph et al. |
| 2012/0172216 A1 | 7/2012 | Böhringer et al. |
| 2012/0174475 A1 | 7/2012 | Mennell et al. |
| 2012/0174476 A1 | 7/2012 | Mennell et al. |
| 2012/0282465 A1 | 11/2012 | Kadam et al. |
| 2012/0285080 A1 | 11/2012 | Despen et al. |
| 2012/0286211 A1 | 11/2012 | Cheiky et al. |
| 2012/0289752 A1 | 11/2012 | Gosselink et al. |
| 2013/0022771 A1 | 1/2013 | Malet et al. |
| 2013/0145684 A1 | 6/2013 | Mennell et al. |
| 2013/0152461 A1 | 6/2013 | Mennell et al. |
| 2013/0152789 A1* | 6/2013 | Polshettiwar ........ B01J 20/0259 423/325 |
| 2013/0295628 A1 | 11/2013 | Retsina et al. |
| 2013/0326935 A1 | 12/2013 | Kimball |
| 2014/0075832 A1 | 3/2014 | Mennell et al. |
| 2014/0075834 A1 | 3/2014 | Mennell |
| 2014/0332363 A1 | 11/2014 | Durand et al. |
| 2014/0338576 A1 | 11/2014 | Mennell et al. |
| 2015/0024328 A1 | 1/2015 | Grill |
| 2015/0114908 A1 | 4/2015 | Traxler et al. |
| 2015/0126362 A1 | 5/2015 | Mennell et al. |
| 2015/0144831 A1 | 5/2015 | Mennell et al. |
| 2015/0196896 A1 | 7/2015 | Mennell et al. |
| 2016/0068759 A1 | 3/2016 | Ellens et al. |
| 2016/0114308 A1 | 4/2016 | Despen et al. |
| 2016/0145519 A1 | 5/2016 | Walter |
| 2016/0244686 A1 | 8/2016 | Dickinson |
| 2016/0280554 A1 | 9/2016 | Despen et al. |
| 2016/0304787 A1 | 10/2016 | Aelion et al. |
| 2017/0137294 A1 | 5/2017 | Marker et al. |
| 2017/0145444 A1 | 5/2017 | Hill et al. |
| 2017/0152440 A1 | 6/2017 | Wilson et al. |
| 2017/0197192 A1 | 7/2017 | Malyala et al. |
| 2017/0321139 A1 | 11/2017 | Despen et al. |
| 2018/0119040 A1 | 5/2018 | Waanders et al. |
| 2018/0127672 A1 | 5/2018 | Mennell et al. |
| 2018/0208852 A1 | 7/2018 | Marsh |
| 2018/0291276 A1 | 10/2018 | Gangwal et al. |
| 2018/0327329 A1 | 11/2018 | Bontchev et al. |
| 2019/0002323 A1 | 1/2019 | Benedek et al. |
| 2019/0194561 A1 | 6/2019 | Mennell et al. |
| 2019/0264121 A1 | 8/2019 | China |
| 2020/0055736 A1 | 2/2020 | Mennell et al. |
| 2020/0056098 A1 | 2/2020 | Seidner |
| 2020/0140901 A1 | 5/2020 | Foody et al. |
| 2020/0255660 A1 | 8/2020 | McGolden |
| 2020/0318018 A1 | 10/2020 | Germanaud et al. |
| 2020/0381732 A1 | 12/2020 | Wagner et al. |
| 2021/0009427 A1 | 1/2021 | Mennell et al. |
| 2021/0155481 A1 | 5/2021 | Kim et al. |
| 2021/0214617 A1 | 7/2021 | Seidner |
| 2021/0220801 A1 | 7/2021 | Mennell et al. |
| 2021/0395630 A1 | 12/2021 | Despen et al. |
| 2022/0098700 A1 | 3/2022 | Mennell et al. |
| 2022/0098701 A1 | 3/2022 | Mennell et al. |
| 2022/0162077 A1 | 5/2022 | Mennell et al. |
| 2022/0228080 A1 | 7/2022 | Mennell et al. |
| 2022/0228082 A1 | 7/2022 | Mennell et al. |
| 2022/0267869 A1 | 8/2022 | Mennell et al. |
| 2022/0340818 A1 | 10/2022 | Mennell et al. |
| 2022/0396529 A1 | 12/2022 | Mennell et al. |
| 2023/0015387 A1 | 1/2023 | Slack et al. |
| 2023/0020752 A1 | 1/2023 | Slack et al. |
| 2023/0045385 A1 | 2/2023 | Mennell et al. |

FOREIGN PATENT DOCUMENTS

| | | | |
|---|---|---|---|
| CN | 101693848 A | 4/2010 | |
| CN | 101775301 | 7/2010 | |
| CN | 101805626 A | 8/2010 | |
| CN | 101525118 | 12/2010 | |
| CN | 102208598 | 10/2011 | |
| CN | 103866072 | 6/2014 | |
| CN | 105498703 A * | 4/2016 | ............ B01J 20/103 |
| CN | 108865195 | 11/2018 | |
| CN | 110438335 | 8/2020 | |
| DE | 202009010612 | 10/2009 | |
| EP | 0930091 | 7/1999 | |
| EP | 2199365 | 6/2010 | |
| GB | 1412407 | 11/1975 | |
| GB | 2460064 | 11/2009 | |
| JP | S47-013408 | 4/1972 | |
| JP | S54135666 | 10/1972 | |
| JP | S55136116 | 10/1980 | |
| JP | BS58-28203 | 6/1983 | |
| JP | S60-238144 | 11/1985 | |
| JP | H0564789 | 3/1993 | |
| JP | 06-88077 | 3/1994 | |
| JP | AH9-29236 | 2/1997 | |
| JP | 10-208985 | 8/1998 | |
| JP | 2000157832 | 6/2000 | |
| JP | 2000-212568 | 8/2000 | |
| JP | 2000-265186 | 9/2000 | |
| JP | 2001-239122 | 9/2001 | |
| JP | 2001-300497 | 10/2001 | |
| JP | 2002-211911 | 7/2002 | |
| JP | 2002-226865 | 8/2002 | |
| JP | 2002-255796 | 9/2002 | |
| JP | 2002-289683 | 10/2002 | |
| JP | 2003-038941 | 2/2003 | |
| JP | 2003-147370 | 5/2003 | |
| JP | 2003-213273 | 7/2003 | |
| JP | 2003-238136 | 8/2003 | |
| JP | 2003-251398 | 9/2003 | |
| JP | 2003-286021 | 10/2003 | |
| JP | 2004-912 | 1/2004 | |
| JP | 2004534641 | 11/2004 | |
| JP | 2005-263547 | 9/2005 | |
| JP | 2005230810 | 9/2005 | |

(56) References Cited

FOREIGN PATENT DOCUMENTS

| | | | | |
|---|---|---|---|---|
| JP | 2005-298602 | 10/2005 | | |
| JP | 2005-334737 | 12/2005 | | |
| JP | 2006-188366 | 7/2006 | | |
| JP | 2006263513 | 10/2006 | | |
| JP | 2006-315899 | 11/2006 | | |
| JP | 2008-024984 | 2/2008 | | |
| JP | 2008-037931 | 2/2008 | | |
| JP | 2008-136558 | 6/2008 | | |
| JP | 2008-222901 | 9/2008 | | |
| JP | 2008-284520 | 11/2008 | | |
| JP | 2009-125070 | 6/2009 | | |
| JP | 2010-194502 | 9/2010 | | |
| JP | 2010-202298 | 9/2010 | | |
| JP | 2010-222474 | 10/2010 | | |
| JP | 2011516263 | 5/2011 | | |
| JP | 2011161330 | 8/2011 | | |
| JP | 2011-230038 | 11/2011 | | |
| JP | 2011-240329 | 12/2011 | | |
| JP | 2006-96615 | 12/2012 | | |
| JP | 2013082588 | 5/2013 | | |
| KR | 101479906 | 1/2015 | | |
| RU | 2425800 C2 * | 8/2011 | ............. | B01J 20/20 |
| RU | 2662440 | 7/2018 | | |
| RU | 2729810 | 8/2020 | | |
| TW | 501939 | 9/2002 | | |
| WO | WO 1990/01529 | 2/1990 | | |
| WO | WO 2000/071936 | 11/2000 | | |
| WO | WO 2002/069351 | 9/2002 | | |
| WO | WO 2005/049530 | 6/2005 | | |
| WO | WO-2005061099 A1 * | 7/2005 | ............. | B01D 53/02 |
| WO | WO 2006/122405 | 11/2006 | | |
| WO | WO 2007/147244 | 12/2007 | | |
| WO | WO 2008/022461 | 2/2008 | | |
| WO | WO 2008/076944 | 6/2008 | | |
| WO | WO 2008/144416 | 11/2008 | | |
| WO | WO 2009/018469 | 2/2009 | | |
| WO | WO 2009/105441 | 8/2009 | | |
| WO | WO 2009/158709 | 12/2009 | | |
| WO | WO 2010/110470 | 9/2010 | | |
| WO | WO 2010/128055 | 11/2010 | | |
| WO | WO 2010/129996 | 11/2010 | | |
| WO | WO 2010/132970 | 11/2010 | | |
| WO | WO 2011/045473 | 4/2011 | | |
| WO | WO 2011/053668 | 5/2011 | | |
| WO | WO 2011/065484 | 6/2011 | | |
| WO | WO 2011/081086 | 7/2011 | | |
| WO | WO 2011/093294 | 8/2011 | | |
| WO | WO 2011/119961 | 9/2011 | | |
| WO | WO 2011/162727 | 12/2011 | | |
| WO | WO 2012/142486 | 10/2012 | | |
| WO | WO 2012/142488 | 10/2012 | | |
| WO | WO 2012/142489 | 10/2012 | | |
| WO | WO 2012/142491 | 10/2012 | | |
| WO | WO 2012/164162 | 12/2012 | | |
| WO | WO 2013/169803 | 11/2013 | | |
| WO | WO 2013/169806 | 11/2013 | | |
| WO | WO 2013/169811 | 11/2013 | | |
| WO | WO 2013/172705 | 11/2013 | | |
| WO | WO 2013/187940 | 12/2013 | | |
| WO | WO 2015/061701 | 4/2015 | | |
| WO | WO 2015/109206 | 7/2015 | | |
| WO | WO 2015/127460 | 8/2015 | | |
| WO | WO 2016/065357 | 4/2016 | | |
| WO | WO 2017/002096 | 1/2017 | | |
| WO | WO 2019/054869 | 3/2019 | | |
| WO | WO 2019/074431 | 4/2019 | | |
| WO | WO 2019/200424 | 10/2019 | | |
| WO | WO 2020/219635 | 10/2020 | | |

OTHER PUBLICATIONS

Kumar et al., "Effects of Carbonisation conditions on the Yield and Chemical Composition of Acacia and Eucalyptus Wood Chars," Biomass and Bioenergy 3(6):411-417 (1992).

Warnecke, "Gasification of biomass: comparison of fixed bed and fluidized bed gasifier," Biomass & Bioenergy, 18:489-497 (2000).

Wretborn, "Pyrolysis of Wood Chips: Influence of Pyrolysis Conditions on Charcoal Yield and Charcoal Reactivity," Degree Project, Energy Engineering, masters level 2016.

Biermann et al., "Carbon Allocation in Multi-Product Steel Mills That Co-process Biogenic and Fossil Feedstocks and Adopt Carbon Capture Utilization and Storage Technologies," Frontiers in Chemical Engineering (publication date: Dec. 9, 2020).

Bronson, Benjamin, "The Effects of Feedstock Pre-treatment on the Fluidized Bed Gasification of Biomass," Thesis submitted to the Faculty of Graduate and Postdoctoral Studies in partial fulfilment of the requirements for M.A.Sc. In Chemical Engineering, University of Ottawa (2014).

Cleveland, Cutler J. and Morris, Christopher. Dictionary of Energy (Expanded Edition)—passive solar cooling (pp. 373). Elsevier. (2009).

De Mattos Carneiro-Junior et al., "Valorization of Prosopis juliflora Woody Biomass in Northeast Brazilian through Dry Torrefaction," Energies, Energies Jun. 11, 2021, 14, 3465.

Demirbas et al., "Estimating the Calorific Values of Lignocellulosic Fuels," Energy Exploration & Exploitation 22(2):135-143 (publication date: Apr. 1, 2004).

Gudka et al., A review of the mitigation of deposition and emission problems during biomass combustion through washing pre-treatment, Journal of the Energy Institute (Published May 2016), vol. 89, Issue 2, May 2016, pp. 159-171.

International Search Report and Written Opinion dated Apr. 1, 2022 for International Application No. PCT/US2022/013151.

International Search Report and Written Opinion dated Apr. 1, 2022 for International Application No. PCT/US2022/013156.

International Search Report and Written Opinion dated Feb. 8, 2022 for International Application No. PCT/US2021/60071.

International Search Report and Written Opinion dated Feb. 8, 2022 for International Application No. PCT/US21/60053.

International Search Report and Written Opinion dated Jul. 15, 2022 for International Application No. PCT/US2022/026591.

International Search Report and Written Opinion dated Jul. 19, 2022 for International Application No. PCT/US2022/026597.

International Search Report and Written Opinion dated Mar. 20, 2023 for International Application No. PCT/US2022/049237.

International Search Report and Written Opinion dated Mar. 29, 2023 for International Application No. PCT/US2022/049240.

International Search Report and Written Opinion dated Nov. 17, 2022 for International Application No. PCT/US2022/039119.

International Search Report and Written Opinion dated Oct. 11, 2022 for International Application No. PCT/US2022/036282.

International Search Report and Written Opinion dated Oct. 11, 2022 for International Application No. PCT/US2022/036292.

International Search Report and Written Opinion dated Oct. 19, 2022 for International Application No. PCT/US2022/039116.

International Search Report and Written Opinion dated Oct. 6, 2022 for International Application No. PCT/US2022/036294.

Keiluweit et al., "Dynamic Molecular Structure of Plant Biomass-Derived Black Carbon (Biochar)," Environ. Sci. Technol. 44:1247-1253 (epublication date: Jan. 25, 2010).

Phasee et al., "An investigation on mechanical property of MSW-derived fuel pellet produced from hydrothermal treatment," Journal of Material Cycles and Waste Management, 20:2028-2040 (publication date: Jun. 15, 2018).

Phyllis Database Phyllis2—ECN Phyllis classification https://phylis.nl/Browse/Standard/ECN-Phyllis#pyrolisis (2015).

Ruksathamcharoen et al., "Effects of hydrothermal treatment and pelletizing temperature on the mechanical properties of empty fruit bunch pellets," Applied Energy, 113385 (epublication date: May 18, 2019).

Tanzer et al., "Can bioenergy with carbon capture and storage result in carbon negative steel?"100:1-15, International Journal of Greenhouse Gas Control (publication date: Jul. 24, 2020) (Abstract only).

Yang et al., "Harmonized comparison of virgin steel production using biomass with carbon capture and storage for negative emissions," 112:1-33, International Journal of Greenhouse Gas Control (publication date: Nov. 23, 2021).

(56) References Cited

OTHER PUBLICATIONS

Andi Supangat et al., "Method for producing activated carbon from combustion of e.g. bamboo, involves naturally removing and cooling furnace material which is separate module of furnace fuel, but closing exhaust holes, when burning process is not sufficient," ID 20121099A (publication date: Mar. 1, 2012).
Antal et al., "The Art, Science and Technology of Charcoal Production," Ind. Eng. Chem. Res., 42:1619-1640 (publication date: Mar. 14, 2003).
Ayanda et al., "Activated Carbon-Fly Ash-Nanometal Oxide Composite Materials:Preparation, Characterization, and Tributyltin Removal Efficiency," Journal of Chemistry. vol. 2013 (2013).
Baldock, "Chemical composition and bioavailability of thermally altered Pinus resinosa (Red pine) wood," Org. Geochem., vol. 33(9), pp. 1093-1109 (publication date: Sep. 2002).
Brodowski, "Morphological and Chemical Properties of Black Carbon in Physical Soil Fractions as Revealed by Scanning Electron Microscopy and Energy-Dispersive X-ray Spectroscopy," Geoderma, vol. 128, pp. 116-129 (publication date: Sep. 2005).
Cheng et al., "Oxidatin of black carbon by biotic and abiotic processes," Organic Geochemistry 37:1477-1488 (publication date: Nov. 2006).
Demirbas, "Effects of Temperature and Particle Size on Bio-Char Yield from Pyrolysisof Agricultural Residues," J. Anal. Appl. Pyrolysis, vol. 72, pp. 243-248 (publication date: Nov. 2004).
Di Felice et al., "Biomass Gasification with Catalytic Tar Reforming: A Model Study into Activity Enhancement of Calcium- and Magnesium-Oxide-Based Catalytic Materials by Incorporation of Iron," Energy Fuels vol. 24, pp. 4034-4045 (publication date: Jun. 25, 2010).
Du, "Some Thoughts on the Chemical Compositions of Fly Ash: ICAR's 17th Annual Symposium. The University of Texas at Austin," (2009).
Edgehill et al. "Adsorption Characteristics of Carbonized Bark for Phenol and Pentachlorophenol," (publication date: Mar. 26, 1999).
Freese et al. "Powdered Activated Carbon: Can This Be Effectively Assessed in the Laboratory," (publication date: May 28-Jun. 1, 2000).
Gupta et al., "Utilisation of bagasse fly ash (a sugar industry waste) for the removal of copper and zinc from wasterwater," Separation and Purification Technology Journal. vol. 18, Issue 2, pp. 131-140 (publication date: Mar. 2000).
Hamer, "Interactive Priming of Black Carbon and Glucose Mineralisation," Org. Geochem., vol. 35, Issue 7, pp. 823-830 (publication date: Jul. 2004).
Hardman et al., "Studies of Spontaneous Combustion in Beds of Activated Carbon,"Fuel, IPC Science and Technology Press, vol. 59, No. 3, pp. 151-156 (publication date: Mar. 1980).
Horst-Günter Brocksiepe et al., "Charcoal," Ullmann, 1-6 pages (publication date: Jun. 1, 2000), Retrieved from the Internet:http://onlinelibrary.wiley.com/store/10.1002/14356007.a06_157/asset/a06_157.pdf?v=1&t=gquxduyp&s=b91546212b19f3a5082f146412cc7473c651f734 [retrieved on Aug. 2, 2011].
Hung, "The Production of Activated Carbon from Coconut Shells Using Pyrolysis and Fluidized Bed Reactors. A Thesis Submitted to the Honors College," The University of Arizona, May 2012, [retrieved on May 4, 2015] [retrieved from the internet] <URL: http://arizona/openrepository.com/arizona/bitstream/10150/243968/1/azuetdmr_20120079_sip1_m.pdf> Abstract, pp. 8, 9, 12, 31-33.
Hwang et al., "Characterization of char derived from various types of solid wastes from the standpoint of fuel recovery and pretreatment before landfilling," Waste Management 27(9):1155-1166 (epublication date: Aug. 22, 2006).
Iqbaldin et al., "Properties of coconut shell activated carbon," Journ. Tropical Forest Science, 25(4):497-503 (publication date: Oct. 2013).
Jha et al., "Sorption properties of the activated carbon-zeolite composite prepared from coal fly ash for Ni(2+), Cu(2+), Cd(2+) and Pb(2+)," Journal of Hazardous Materials. vol. 160, Issue 1 pp. 148-153 (publication date: Dec. 15, 2008, epublication date: Mar. 6, 2008).
Khan et al., "Removal of trace elements from Thar coal to minimize its hazardous effect on the environment," Journal of Himalayan Earth Sciences 49(1):50-57 (2016).
Kuzyakov, "Black Carbon Decomposition and Incorporation into Soil Microbial BiomassEstimated by 14C Labeling," Soil Bio & Biochem., vol. 4, pp. 210-219 (publication date: Feb. 2009).
Lakdawala et al., "The effect of low cost material Bagasse Fly ash to the removal of Cod Contributing component of combined waste water of Sugar Industry," Scholars Research Library (publication date: Apr. 2012).
Lehmann, "Bio-energy in the black," Front. Ecol. Enviorn., vol. 5(7), pp. 381-387 (publication date: Sep. 1, 2007).
MacKay, "The Dependence of Char and Carbon Yield on Lignocellulosic Precursor Composition," Carbon, col. 20(2), pp. 87-94 (1982).
Martin et al., "Gasification and Production of Biochar from Wastewater Grown Algae," Water New Zealand Annual Conference, Sep. 22-24, 2010, XP055337229, Retrieved From the Internet: URL:https://www.waternz.org.nz/Attachment?Action=Download&Attachment_id=1127 [retrieved on Jan. 20, 2017].
Novack, "Impact of Biochar Amendment on Fertility of a Southeastern Coastal Plain Soil," Soil Sci., vol. 174(2), pp. 105-112 (publication date: Feb. 2009).
PCT/US2009/069133 International Search Report and Written Opinion dated Jul. 26, 2011.
PCT/US2009/069403 International Search Report and Written Opinion dated Jul. 26, 2011.
PCT/US2012/033624 International Search Report dated Sep. 17, 2012.
PCT/US2012/033627 International Search Report dated Jul. 13, 2012.
PCT/US2012/033628 International Search Report dated Jul. 6, 2012.
PCT/US2012/033630 International Search Report dated Aug. 21, 2012.
PCT/US2012/033630 Written Opinion dated Aug. 21, 2012.
PCT/US2013/039981 International Search Report dated Oct. 22, 2013.
PCT/US2013/039986 International Search Report dated Oct. 26, 2013.
PCT/US2013/039991 International Search Report dated Dec. 16, 2013.
PCT/US2014/062202 International Search Report and Written Opinion dated Feb. 3, 2015.
PCT/US2015/011787 International Search Report dated Jun. 11, 2015.
PCT/US2015/017351 International Search Report dated May 15, 2015.
PCT/US2015/57370 International Search Report dated Jan. 8, 2016.
Purnomo et al., "Preparation and characterization of activated carbon from bagasse fly ash," Journal of Analytical and Applied Pyrolysis. vol. 91, Issue 1, pp. 257-262 (publication date: May 2011).
Saravanakumar et al., "Experimental investigations of long stick wood gasification in a bottom lit updraft fixed bed gasifier," Fuel Processing Technology, 88(6):617-622 (publication date: Jun. 2007).
Shinogi et al., "Pyrolysis of plant, animal and human waste: physical and chemical characterization of the pyrolytic products," Bioresource Technology 90:241-247 (publication date: Dec. 2003).
Tay et al., "Preparation and characterization of activated carbon from waste biomass," Journal of Hazardous Materials ND 165(1-3):481-485 (publication date: Jun. 15, 2009).
Ueda, Shigeru et al., "Improvement of Reactivity of Carbon Iron Ore Composite with Biomass Char for Blast Furnace," ISIJ International (2009) 49(10):1505-1512.
Yan et al., "Thermal Pretreatment of Lignocellulosic Biomass," Environmental 282. Progress and Sustainable Energy, vol. 28, No. 3, pp. 435-440 (epublication date: Aug. 5, 2009).
Anonymous et al., "Bet specific Surface Area," (publication date: Jan. 1, 2021).

(56) References Cited

OTHER PUBLICATIONS

Barrett et al., "The Determination of Pore Volume and Area Distributions in Porous Substances. I Computations from Nitrogen Isotherms," Journal of American Chemical Society, 73:373-380 (publication date: Jan. 1, 1951).

Demiral et al., Surface properties of activated carbon prepared from wastes, Surface and Interface Analysis, 40(3-4):612-615 (publication date: Jan. 23, 2008).

Designation: D6556-14 ASTB Standard Test Method for Carbon Black—Total and External Surface Area by Nitrogen Adsorption 1, pp. 1-5 (publication date: Jan. 1, 2014).

Du et al., "Determination of iodine number of activated carbon by the method of ultraviolet-visible spectroscopy," Materials Letters, 285:129137 (2021).

Gómez-Serrano et al., "Nitrogen adsorption isotherms on carbonaceous materials. Comparison of Bet and Langmuir surface areas," Powder Technology, 116:103-108 (publication date: May 2001).

Gong et al., "Direct reduction of iron oxides based on stream reforming of bio-oil: a highly efficient approach for production of DRI from bio-oil and iron ores," Green Chemistry 11(12):2001-2012 (publication date: Jan. 1, 2009).

Guo et al., "Direct reduction of oxidized iron ore pellets using biomass syngas as the reducer," Fuel Process Technology 148:276-281 (epublication date: Mar. 22, 2016).

Häussinger et al., "Hydrogen, 3. Purification," Ullmann's Encyclopedia of Industrial Chemistry 18:309-333 (publication date: Oct. 15, 2011).

International Search Report and Written Opinion dated Apr. 12, 2024 for International Application No. PCT/US2023/085438, 12 pages.

International Search Report and Written Opinion dated Feb. 16, 2024 for International Application No. PCT/US2023/035676, 14 pages.

International Search Report and Written Opinion dated Mar. 19, 2024 for International Application No. PCT/US2023/085470, 9 pages.

Matthias Binder: "Hydrogen from biomass gasification," pp. 1-85 (publication date: Jan. 7, 2019).

Nogueira et al., "Production of Self-Reducing Pellets From Organic Household Waste," Technical contribution at the 45th Seminar for Reduction of Iron Ore and Raw Materials, 16th Brazilian Symposium for Iron Ore, and 3rd Brazilian Symposium for Iron Ore Agglomeration, an integral part of ABM Week, held from Aug. 17, 2015 Rio de Janeiro, RJ, Brazil.

Pallarés et al., "Production and characterization of activated carbon from barley straw by physical activation with carbon dioxide and steam," Biomass and Bioenergy, 115:64-73 (Publication date: Apr. 15, 2018).

Pronobis, "Evaluation of the influence of biomass co-combustion on boiler furnace slagging by means of fusibility correlations," Biomass and Bioenergy 28:275-383 (epublication date: Jan. 17, 2005).

Schiegl, W.W., et al., "Earth and Planetary Science Letters," North-Holland Publishing Comp., Amsterdam Deuterium Content of Organic Matter, pp. 307-313 (publication date: Aug. 25, 1969).

Wei et al., "Current status and potential of biomass utilization in ferrous metallurgical industry," Renewable and Sustainable Energy Reviews 68:511-524 (epublication date: Oct. 21, 2016).

Zaid et al., "Coal Combustion Analysis Tool in Coal Fired Power Plant for Slagging and Fouling Guidelines," The 10th International Meeting of Advances in Thermofluids, AIP Conf. Proc. 2062, 020028 1-022028-7 (publication date: Jan. 25, 2019).

* cited by examiner

BIOGENIC POROUS CARBON SILICON DIOXIDE COMPOSITIONS

PRIORITY CLAIM

This application is a 371 U.S. National Stage Application of International patent Application No. PCT/US2019/036881 filed Jun. 13, 2019, which claims priority to U.S. Provisional Patent Application Ser. No. 62/685,126, which was filed on Jun. 14, 2018, the entire contents of which are incorporated herein by reference.

FIELD OF THE INVENTION

The present disclosure generally relates to biogenic porous carbon silicon dioxide compositions and methods of making and uses thereof.

BACKGROUND

Use of biogenic porous carbon silicon dioxide compositions have the potential to reduce the use, and environmental consequences of, non-renewable reagents in silicon production. Use of these biogenic porous carbon silicon dioxide compositions also have the potential to increase throughput, decrease energy use, extend electrode life, create greater purity silicon, allow use of small size silicon dioxide (quartz) in typical electric arc and submerged arc furnaces, and allow re-use of silica fume, thereby improving the production of silicon. Such compositions, and methods of making and using, are disclosed herein.

SUMMARY

The present disclosure provides for biogenic porous carbon silicon dioxide compositions and methods of production and uses thereof.

Provided herein are high-carbon compositions comprising silicon dioxide. The compositions can comprise, on a dry basis: at least about 50 wt % total carbon, at most about 5 wt % hydrogen, at most about 1 wt % nitrogen, at most about 0.5 wt % phosphorus, at most about 0.2 wt % sulfur, at most about 0.02 wt % titanium, at most about 0.5% calcium, at most about 0.1% aluminum, and silicon dioxide.

The compositions can comprise, on a dry basis: at least about 50 wt % total carbon, at most about 5 wt % hydrogen, at most about 1 wt % nitrogen, at most about 0.5 wt % phosphorus, at most about 0.2 wt % sulfur, at most about 0.02 wt % titanium, at most about 0.5% calcium, at most about 0.1% aluminum, and silicon dioxide; wherein the silicon dioxide can be comprised within river rock.

The compositions can comprise, on a dry basis: at least about 50 wt % total carbon, at most about 5 wt % hydrogen, at most about 1 wt % nitrogen, at most about 0.5 wt % phosphorus, at most about 0.2 wt % sulfur, at most about 0.02 wt % titanium, at most about 0.5% calcium, at most about 0.1% aluminum, and silicon dioxide; wherein the silicon dioxide can be comprised within silica fume.

In some embodiments, the carbon comprises biogenic carbon. In some embodiments, the carbon comprises non-biogenic carbon. The compositions can comprise at least about 55 wt %, at least about 60 wt %, at least about 65 wt %, at least about 70 wt %, at least about 75 wt %, at least about 80 wt %, at least about 90 wt %, or at least about 95 wt % total carbon. In some embodiments, the composition comprises at least about 55 wt % total carbon.

The compositions can comprise at least about 1 wt %, at least about 5 wt %, at least about 10 wt %, at least about 15 wt %, at least about 20 wt %, or at least about 25 wt % silicon dioxide.

In some embodiments, the silicon dioxide is comprised within river rock. In some embodiments, the silicon dioxide comprises silica fume.

In some embodiments, the compositions have been extruded. In some embodiments, the compositions have been extruded to form a pellet. In some embodiments, the compositions have been extruded to improve the density of the composition; mix the carbon and silicon dioxide; improve the combined product density, thereby allowing it to "sink" in an electric arc furnace; or create a water and dust resistant exterior of the composition for improved use and improved furnace efficiencies.

In some embodiments, the compositions have been densified.

In some embodiments, the compositions have dimensions of at least about 0.64 cm (0.25 in) by about 2.5 cm (1.0 in) to at most about 5.1 cm (2.0 in) by about 15 cm (6.0 in).

In some embodiments, the compositions have a bulk density of about 560 kg/m$^3$ (35 lb/ft$^3$) to about 720 kg/m$^3$ (45 lb/ft$^3$).

In some embodiments, the compositions have an Iodine Number of at least about 300.

In some embodiments, the compositions have a moisture ($H_2O$) content of from about 1% to about 45%. In some embodiments, the compositions have a moisture ($H_2O$) content of less than about 1%.

The compositions can comprise a high-carbon reagent composition comprising, on a dry basis: at least about 50 wt % total carbon, at most about 5 wt % hydrogen, at most about 1 wt % nitrogen, at most about 0.5 wt % phosphorus, at most about 0.2 wt % sulfur, at most about 0.02 wt % titanium, at most about 0.5% calcium, at most about 0.1% aluminum, and at least about 15 wt % silicon dioxide; wherein the silicon dioxide can be comprised within river rock; and wherein the composition can be densified, can be pellet shaped with dimensions of about 0.64 cm (0.25 in) by about 2.5 cm (1.0 in), and can have a bulk density of about 560 kg/m$^3$ (35 lb/ft$^3$) to about 720 kg/m$^3$ (45 lb/ft$^3$).

The compositions can comprise a high-carbon reagent composition comprising, on a dry basis: at least about 50 wt % total carbon, at most about 5 wt % hydrogen, at most about 1 wt % nitrogen, at most about 0.5 wt % phosphorus, at most about 0.2 wt % sulfur, at most about 0.02 wt % titanium, at most about 0.5% calcium, at most about 0.1% aluminum, and at least about 15 wt % silicon dioxide; wherein the silicon dioxide can be comprised within silica fume; and wherein the composition can be densified, can be pellet shaped with dimensions of about 0.64 cm (0.25 in) by about 2.5 cm (1.0 in), and can have a bulk density of about 560 kg/m$^3$ (35 lb/ft$^3$) to about 720 kg/m$^3$ (45 lb/ft$^3$).

Provided herein are processes for producing a high-carbon biogenic reagent. The processes can comprise: providing a carbon-containing feedstock comprising dry biomass; in a preheating zone, preheating the feedstock in the presence of a substantially inert gas for at least about 5 minutes and with a preheating temperature selected from about 80° C. to about 500° C.; in a pyrolysis zone, pyrolyzing the feedstock in the presence of a substantially inert gas for at least about 10 minutes and with a pyrolysis temperature selected from about 250° C. to about 700° C., to generate hot pyrolyzed solids, condensable vapors, and non-condensable gases; separating at least a portion of the condensable vapors and at least a portion of the non-condensable gases from the hot pyrolyzed solids; in a cooling zone, cooling the hot pyrolyzed solids, in the presence of the substantially inert gas for at least about 5 minutes and with a cooling temperature less than the pyrolysis temperature, to generate warm pyrolyzed solids; in a cooler that is separate from the cooling zone, cooling the warm pyrolyzed solids to generate cool pyrolyzed solids; and recovering a high-carbon biogenic reagent comprising at least a portion of the cool pyrolyzed solids; wherein the process further comprises introducing silicon dioxide feedstock into the process.

In some embodiments, the processes further comprise drying the feedstock to remove at least a portion of moisture contained within the feedstock.

In some embodiments, the processes further comprise deaerating the feedstock or the dried feedstock to remove at least a portion of interstitial oxygen, if any, contained with the feedstock.

In some embodiments, the processes further comprise, in a cooler that is separate from the cooling zone, further cooling the warm pyrolyzed solids to generate cool pyrolyzed solids.

In some embodiments, the processes further comprise introducing silicon dioxide feedstock to the cool pyrolyzed solids. In some embodiments, the processes further comprise introducing silicon dioxide feedstock to the feedstock prior to pyrolysis.

In some embodiments, introducing silicon dioxide feedstock comprises introducing silica fume. In some embodiments, introducing silicon dioxide comprises introducing river rock. In some embodiments, the particle size of the silicon dioxide feedstock, whether river rock or silica fume, can be from about 0.01 mm to about 12 mm. In some embodiments, the particle size can be from about 0.01 mm to about 12 mm, in increments of about 0.05 mm.

In some embodiments, the processes further comprise densification.

In some embodiments, densification can comprise: using an additive for improved densification; mixing of the additive, carbon, and silicon dioxide; extruding the mixture through a die to thereby produce pellets; and optionally drying the pellets.

In some embodiments, densification can comprise: optionally using an additive, for example, bentonite, for improved densification from about 0.5% to about 15%, in increments of about 0.5%; optionally adding water, for example, from about 5% to about 50% water; mixing of the additive, carbon, and silicon dioxide; extruding the mixture through a die to thereby produce pellets; optionally heating or cooling the extruder and/or die plate to improve densification; optionally degassing the extruder; and optionally drying the pellets.

In some embodiments, the processes further comprise pressing, binding, pelletizing, extruding, or agglomerating the high-carbon biogenic reagent.

DETAILED DESCRIPTION

Figure 1:
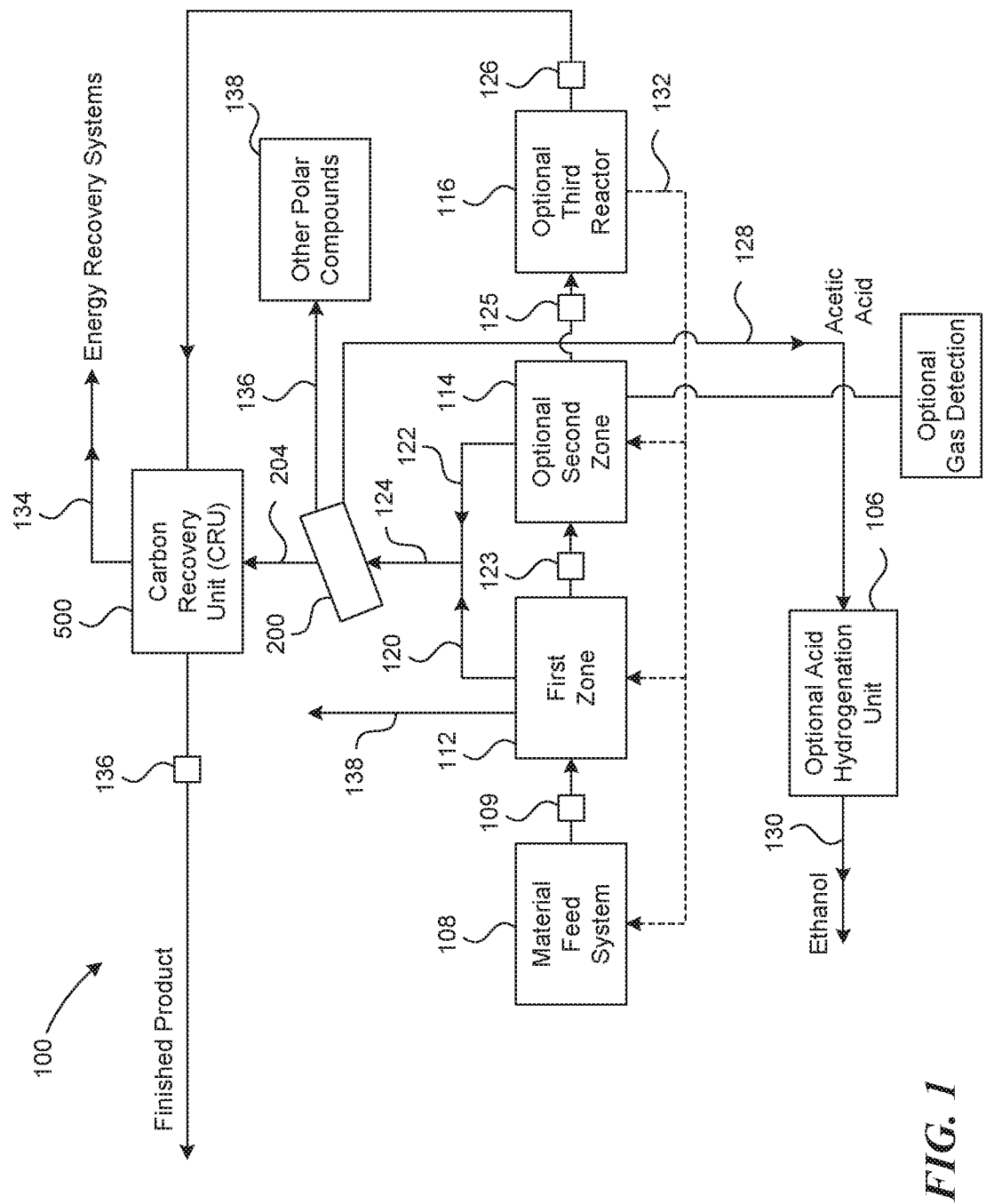
FIG. 1 depicts a multi-reactor embodiment of a system of the invention.

The present disclosure provides for biogenic porous carbon silicon dioxide compositions and methods of production and uses thereof.

This description will enable one skilled in the art to make and use the disclosure, and it describes several embodiments, adaptations, variations, alternatives, and uses of the disclosure. These and other embodiments, features, and advantages of the present disclosure will become more apparent to those skilled in the art when taken with reference to the following detailed description of the disclosure in conjunction with the accompanying drawings.

Definitions

As used herein, the term "at most" provides for a minimum value of "trace amounts."

As used herein, the term "carbon" can mean biogenic or non-biogenic carbon. "Biogenic" is intended to mean a material (whether a feedstock, product, or intermediate) that contains an element, such as carbon, that is renewable on time scales of months, years, or decades. Non-biogenic materials can be non-renewable, or can be renewable on time scales of centuries, thousands of years, millions of years, or even longer geologic time scales. A biogenic material may include a mixture of biogenic and non-biogenic sources.

As used herein, the term "biomass," shall be construed as any biogenic feedstock or mixture of a biogenic and non-biogenic feedstock. Elementally, biomass includes at least carbon, hydrogen, and oxygen. The methods and apparatus of the disclosure can accommodate a wide range of feedstocks of various types, sizes, and moisture contents.

As used herein, the term "activation" refers to any of the various processes by which the pore structure is enhanced.

As used herein, the phrase "porous carbon" describes materials that can be produced by processes and systems of the disclosure, in various embodiments. Limitations as to carbon content, or any other concentrations, shall not be imputed from the term itself but rather only by reference to particular embodiments and equivalents thereof. For example, it will be appreciated that a starting material having very low initial carbon content, subjected to the disclosed processes, may produce a biogenic porous carbon that is highly enriched in carbon relative to the starting material (high yield of carbon), but nevertheless relatively low in carbon (low purity of carbon), including less than or equal to about 50 wt % carbon.

As used herein, the term "silicon dioxide" ($SiO_2$) is interchangeable with the term "silica."

As used herein, the term "reagent" is intended to mean a material in its broadest sense; a reagent can be, for example, a fuel, a chemical, a material, a compound, an additive, a blend component, a solvent. A reagent is not necessarily a chemical reagent that causes or participates in a chemical reaction. A reagent may or may not be a chemical reactant; it may or may not be consumed in a reaction. A reagent can be a chemical catalyst for a particular reaction. A reagent may cause or participate in adjusting a mechanical, physical, or hydrodynamic property of a material to which the reagent can be added. For example, a reagent can be introduced to a metal to impart certain strength properties to the metal. A reagent can be a substance of sufficient purity (which, in the current context, is typically carbon purity) for use in chemical analysis or physical testing.

As used herein, the terms "pyrolysis" and "pyrolyze" generally refer to thermal decomposition of a carbonaceous material.

As used herein, the term "reactor" refers to a discrete unit in which atmospheric and temperature conditions can be controlled and in which a physical and/or chemical reaction can take place.

As used herein, the term "zone" refers to an area within a reactor in which temperature conditions and atmospheric conditions can be controlled relative to other zones within the reactor.

As used herein, the term "biomass processing unit" refers to a reactor that includes a plurality of zones as discussed in more detail below.

As used herein, the term "carbonization" herein means increasing the carbon content in a given amount of biomass. Carbonization can illustratively be accomplished by reducing non-carbon containing material from the biomass, adding carbon atoms to the biomass or both to form a "high-carbon biogenic reagent."

As used herein, where the indefinite article "a" or "an" is used with respect to a statement or description of the presence of a step in a process disclosed herein, unless the statement or description explicitly provides to the contrary, the use of such indefinite article does not limit the presence of the step in the process to one in number. As used herein, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed.

Where a range of numerical values is recited herein, unless otherwise stated, the range is intended to include the endpoints thereof, and all integers and fractions within the range. It is not intended that the scope of the invention be limited to the specific values recited when defining a range.

As used herein, the terms "comprising" and "including", or grammatical variants thereof are to be taken as specifying inclusion of the stated features, integers, actions or components without precluding the addition of one or more additional features, integers, actions, components or groups thereof. For example, a composition, a mixture, process, method, article, or apparatus that comprises a list of elements is not necessarily limited to only those elements but can include other elements not expressly listed or inherent to such composition, mixture, process, method, article, or apparatus. "Comprising" is broader than and includes the terms "consisting of" and "consisting essentially of" as defined by the Manual of Patent Examination Procedure of the United States Patent and Trademark Office. Further, unless expressly stated to the contrary, "or" refers to an inclusive or and not to an exclusive or.

Unless otherwise indicated, all numbers expressing reaction conditions, stoichiometries, concentrations of components, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

Compositions

Provided herein are biogenic carbon compositions comprising silicon dioxide. The compositions can comprise, on a dry basis: at least about 50 wt % total carbon, at most about 5 wt % hydrogen, at most about 1 wt % nitrogen, at most about 0.5 wt % phosphorus, at most about 0.2 wt % sulfur, at most about 0.02 wt % titanium, at most about 0.5% calcium, at most about 0.1% aluminum, and silicon dioxide.

The compositions can comprise, on a dry basis: at least about 55 wt %, at least about 60 wt %, at least about 65 wt %, at least about 70 wt %, at least about 75 wt %, at least about 80 wt %, at least about 90 wt %, or at least about 95 wt % total carbon; at most about 5 wt % hydrogen; at most about 1 wt % nitrogen; at most about 0.5 wt % phosphorus; at most about 0.2 wt % sulfur; at most about 0.02 wt % titanium; at most about 0.5% calcium; at most about 0.1% aluminum; and at least about 1 wt %, at least about 5 wt %, at least about 10 wt %, at least about 15 wt %, at least about 20 wt %, or at least about 25 wt % silicon dioxide.

The compositions can comprise, on a dry basis: at least about 50 wt % total carbon, at most about 5 wt % hydrogen, at most about 1 wt % nitrogen, at most about 0.5 wt % phosphorus, at most about 0.2 wt % sulfur, at most about 0.02 wt % titanium, at most about 0.5% calcium, at most about 0.1% aluminum, and at least about 15 wt % silicon dioxide; wherein the silicon dioxide is comprised within river rock; and wherein the composition has been densified, is pellet shaped with dimensions of at least about 0.64 cm (0.25 in) by about 2.5 cm (1.0 in), and has a bulk density of about 560 kg/m$^3$ (35 lb/ft$^3$) to about 720 kg/m$^3$ (45 lb/ft$^3$).

The compositions can comprise, on a dry basis: at least about 50 wt % total carbon, at most about 5 wt % hydrogen, at most about 1 wt % nitrogen, at most about 0.5 wt % phosphorus, at most about 0.2 wt % sulfur, at most about 0.02 wt % titanium, at most about 0.5% calcium, at most about 0.1% aluminum, and at least about 15 wt % silicon dioxide; wherein the silicon dioxide is comprised within silica fume; and wherein the composition has been densified, is pellet shaped with dimensions of at least about 0.64 cm (0.25 in) by at least about 2.5 cm (1.0 in), and has a bulk density of about 560 kg/m³ (35 lb/ft³) to about 720 kg/m³ (45 lb/ft³).

The compositions can comprise at least about 55 wt %, at least about 60 wt %, at least about 65 wt %, at least about 70 wt %, at least about 75 wt %, at least about 80 wt %, at least about 90 wt %, or at least about 95 wt % total carbon.

The compositions can comprise at least about 1 wt %, at least 5 wt %, at least about 10 wt %, at least about 15 wt %, at least about 20 wt %, or at least about 25 wt % silicon dioxide.

In some embodiments, the starting material for producing biogenic carbon compositions has a very low initial carbon content however, once subjected to the disclosed processes, the resulting composition is highly enriched in carbon relative to the starting material (high yield of carbon), but nevertheless relatively low in carbon (low purity of carbon), including less than or equal to about 50 wt % carbon. The biogenic carbon of the present disclosure has relatively high carbon content compared to the initial feedstock utilized to produce the biogenic carbon. The biogenic carbon will normally contain greater than about half its weight as carbon, since the typical carbon content of biomass is no greater than about 50 wt %. More typically, but depending on feedstock composition, a biogenic carbon will contain at least about 55 wt %, at least about 60 wt %, at least about 65 wt %, at least about 70 wt %, at least about 75 wt %, at least about 80 wt %, at least about 85 wt %, at least about 90 wt %, at least about 95 wt %, at least about 96 wt %, at least about 97 wt %, at least about 98 wt %, or at least about 99 wt % carbon.

In some embodiments, the biogenic carbon composition has been activated. Activation refers to any process by which the resulting pore size of the carbon is enhanced. Conventional processes for producing porous carbon require large energy inputs and suffer from low yields.

Various embodiments of the present disclosure use carbon-containing feedstocks other than biomass, such as a fossil fuel (e.g., coal or petroleum coke), or any mixtures of biomass and fossil fuels (such as biomass/coal blends). In some embodiments, a biogenic feedstock is, or includes, coal, oil shale, crude oil, asphalt, or solids from crude-oil processing (such as petcoke). Feedstocks may include waste tires, recycled plastics, recycled paper, and other waste or recycled materials. Any method, apparatus, or system described herein can be used with any carbonaceous feedstock. Carbon-containing feedstocks can be transportable by any known means, such as by truck, train, ship, barge, tractor trailer, or any other vehicle or means of conveyance.

In some embodiments, the biogenic carbon composition of the present disclosure comprises silicon dioxide ($SiO_2$). In some embodiments, the $SiO_2$ can be raw $SiO_2$. In another embodiment, the $SiO_2$ is comprised within river rock or quartz. In yet another embodiment, the $SiO_2$ can be comprised within silica fume.

In some embodiments, the composition is a reagent. In some embodiments, the composition is a biogenic carbon reagent. In another embodiment, the composition is high-carbon biogenic reagent.

In some embodiments, the composition has been extruded. Extrusion can be utilized to, for example, modify particle sizes of the carbon in order to enhance density; mix the carbon and silicon dioxide; enhance combined product density, so as to produce a product that will "sink" in an electric arc furnace; and create a water and dust resistant exterior of the extrudate for improved use and improved furnace efficiencies.

In some embodiments, the composition has been densified. A process of densification is described in more detail below.

In some embodiments, the compositions are pellet shaped. In some embodiments, the compositions can have dimensions of at least about 0.64 cm (0.25 in) by about 2.5 cm (1.0 in) to at most about 5.1 cm (2.0 in) by about 15 cm (6.0 in). For example, the composition can have the particle sizes as shown in Table 1 below.

TABLE 1

Particle size of the silicon dioxide porous carbon according to the present disclosure.

| Sample Weight Total:<br>Weight Retained | 56 | | % Retained |
|---|---|---|---|
| 4 mesh | 2.2 | 0.039 | 3.9 |
| 8 mesh | 5.7 | 0.102 | 10.2 |
| 20 mesh | 23.4 | 0.418 | 41.8 |
| 30 mesh | 12.7 | 0.227 | 22.7 |
| 100 mesh | 10.8 | 0.193 | 19.3 |
| −100 mesh | 0.1 | 0.002 | 0.2 |

In some embodiments, the composition can have a bulk density of about 560 kg/m³ (35 lb/ft³) to about 720 kg/m³ (45 lb/ft³). In some embodiments, the bulk density of the compositions can be about 550 kg/m³ (34 lb/ft³), about 560 kg/m³ (35 lb/ft³), about 570 kg/m³ (36 lb/ft³), about 580 kg/m³ (36 lb/ft³), about 590 kg/m³ (37 lb/ft³), about 600 kg/m³ (37 lb/ft³), about 610 kg/m³ (38 lb/ft³), about 620 kg/m³ (39 lb/ft³), about 630 kg/m³ (39 lb/ft³), about 640 kg/m³ (40 lb/ft³), about 650 kg/m³ (41 lb/ft³), about 660 kg/m³ (41 lb/ft³), about 670 kg/m³ (42 lb/ft³), about 680 kg/m³ (42 lb/ft³), about 690 kg/m³ (43 lb/ft³), about 700 kg/m³ (44 lb/ft³), about 710 kg/m³ (44 lb/ft³), about 720 kg/m³ (45 lb/ft³), about 730 kg/m³ (46 lb/ft³), about 740 kg/m³ (46 lb/ft³), or about 750 kg/m³ (47 lb/ft³). In some embodiments, the bulky density of the compositions is about 560 kg/m³ (35 lb/ft³) to about 720 kg/m³ (45 lb/ft³), about 650 kg/m³ (41 lb/ft³) to about 700 kg/m³ (44 lb/ft³), about 670 kg/m³ (42 lb/ft³) to about 710 kg/m³ (44 lb/ft³), or about 630 kg/m³ (39 lb/ft³) to about 730 kg/m³ (46 lb/ft³).

Increased porosity improves reactivity of the carbon and facilitates conversion of the compositions to pure silicon. The compositions can be iodine number of at least about 300. The Iodine Number is a parameter used to characterize porous carbon performance. The Iodine Number measures the degree of activation of the carbon, and is a measure of micropore (e.g., 0-20 Å) content. It is an important measurement for liquid-phase applications. In some embodiments, the porous carbon products produced by embodiments of the disclosure have an Iodine Number of about 300, about 400, about 500, about 600, about 750, about 900, about 1000, about 1100, about 1200, about 1300, about 1500, about 1600, about 1750, about 1900, about 2000, about 2100, and about 2200. In some embodiments, the porous carbon products produced by the embodiments of the disclosure have an Iodine Number of at least about 300, at least about 400, at least about 500, at least about 600, at least about 750, at least about 900, at least about 1000, at least about 1100, at least about 1200, at least about 1300, at least about 1500, at least about 1600, at least about 1750, at least about 1900, at least about 2000, at least about 2100, and at least about 2200. In yet another embodiment, the porous carbon products produced by the embodiments of the disclosure have an Iodine Number of about 300 to about 2200, about 500 to about 1500, about 750 to about 1750, about 900 to about 1300, about 1000 to about 1500, about 1500 to about 2200, or about 1200 to about 1900.

Processes

Provided herein are processes for producing a high-carbon biogenic reagent. In some embodiments, the processes can comprise: providing a carbon-containing feedstock comprising dry biomass; in a preheating zone, preheating the feedstock in the presence of a substantially inert gas for at least about 5 minutes and with a preheating temperature selected from about 80° C. to about 500° C.; in a pyrolysis zone, pyrolyzing the feedstock in the presence of a substantially inert gas for at least about 10 minutes and with a pyrolysis temperature selected from about 250° C. to about 700° C., to generate hot pyrolyzed solids, condensable vapors, and non-condensable gases; separating at least a portion of the condensable vapors and at least a portion of the non-condensable gases from the hot pyrolyzed solids; in a cooling zone, cooling the hot pyrolyzed solids, in the presence of the substantially inert gas for at least about 5 minutes and with a cooling temperature less than the pyrolysis temperature, to generate warm pyrolyzed solids; in a cooler that is separate from the cooling zone, cooling the warm pyrolyzed solids to generate cool pyrolyzed solids; and recovering a high-carbon biogenic reagent comprising at least a portion of the cool pyrolyzed solids; wherein the process further comprises introducing silicon dioxide into the process.

There is disclosed herein a process for producing a high-carbon biogenic reagent, the process comprising: providing a carbon-containing feedstock comprising biomass; optionally drying the feedstock to remove at least a portion of moisture contained within the feedstock; optionally deaerating the feedstock or the dried feedstock to remove at least a portion of interstitial oxygen, if any, contained with the feedstock; in a pyrolysis zone, pyrolyzing the feedstock in the presence of a substantially inert gas for at least about 10 minutes and with a pyrolysis temperature selected from about 250° C. to about 700° C., to generate hot pyrolyzed solids, condensable vapors, and non-condensable gases; separating at least a portion of the condensable vapors and at least a portion of the non-condensable gases from the hot pyrolyzed solids; in a cooling zone, cooling the hot pyrolyzed solids, in the presence of the substantially inert gas for at least about 5 minutes and with a cooling-zone temperature less than the pyrolysis temperature, to generate warm pyrolyzed solids; in an optional cooler that is separate from the cooling zone, further cooling the warm pyrolyzed solids to generate cool pyrolyzed solids; and recovering a high-carbon biogenic reagent comprising at least a portion of the warm or cool pyrolyzed solids.

In some embodiments, during pyrolysis, less oxygen is present in an amount less than is required to complete combustion of the material. In some embodiments, the oxygen is present in less than or equal to about 10%, less than or equal to about 5%, less than or equal to about 1%, less than or equal to about 0.5%, less than or equal to about 0.1%, or less than or equal to about 0.01% of the oxygen that is required for complete combustion. In some embodiments, pyrolysis is performed in the absence of oxygen.

In some embodiments, the processes for producing a high-carbon biogenic reagent include a reactor. In some embodiments, the reactor is a discrete unit in which atmospheric temperature and conditions can be controlled. In some embodiments, the reaction takes place in the reactor. In another embodiment, the reactor can include one or more zones. In some embodiments, the one or more zones is an area within the reactor in which the temperature and atmospheric conditions can be controlled relative to other zones within the reactor.

In various embodiments, the processes for producing a high-carbon biogenic reagent include a biomass processing unit ("BPU"). In some embodiments, the BPU includes a plurality of output passageways configured to transfer the raw material or feedstock at different stages of processing, gases, condensate byproducts, and heat from various reactors and zones to any one or more of the other reactors or zones, the material feed system, the carbon recovery unit, and any other contemplated components of the system described herein. In one embodiment, after the raw material has passed through each of the zones of the BPU, the raw material is carbonized.

In some embodiments, the processes for producing a high-carbon biogenic reagent include carbonization. In some embodiments, carbonization can illustratively be accomplished by reducing non-carbon containing material from the biomass, adding carbon atoms to the biomass or both to form a "high-carbon biogenic reagent."

As discussed below, various multi-zone BPU embodiments include a single reactor and various multi-zone BPU embodiments could also include more than one separate reactor. It should be appreciated that other embodiments discussed below include multiple separate reactors, each reactor having at least one zone. For the purposes of this disclosure, the properties, principles, processes, alternatives, and embodiments discussed with respect to all single reactor multi-zone BPU embodiments apply equally to all multiple separate reactor embodiments, and vice-versa.

In some embodiments, the process comprises drying the feedstock to remove at least a portion of moisture contained within the feedstock. In these or other embodiments, the process comprises deaerating the feedstock to remove at least a portion of interstitial oxygen contained with the feedstock.

The process may further include preheating the feedstock, prior to step (d), in a preheating zone in the presence of the substantially inert gas for at least about 5 minutes and with a preheating temperature selected from about 80° C. to about 500° C., or from about 300° C. to about 400° C.

In some embodiments, the pyrolysis temperature is selected from about 400° C. to about 600° C. In some embodiments, pyrolysis in step (d) is carried out for at least about 20 minutes. The cooling-zone temperature may be selected from about 150° C. to about 350° C., for example.

Pyrolysis conditions may be selected to maintain the structural integrity or mechanical strength of the high-carbon biogenic reagent relative to the feedstock, when it is desired to do so for a certain product application.

In some embodiments, each of the zones is located within a single reactor or a BPU. In other embodiments, each of the zones is located in separate BPUs or reactors. It should be appreciated that some embodiments include one or more BPUs, each including at least one zone.

The substantially inert gas may be selected from the group consisting of $N_2$, Ar, CO, $CO_2$, $H_2$, $CH_4$, and combinations thereof. Some of the substantially inert gas may include one or more non-condensable gas species (e.g., CO and $CO_2$) recycled from step (e). In some embodiments, the pyrolysis zone and the cooling zone each comprise a gas phase containing less than 5 wt % oxygen, such as about 1 wt % oxygen or less.

The process may be continuous, semi-continuous, or batch. In some continuous or semi-continuous embodiments, the inert gas flows substantially countercurrent relative to the direction of solids flow. In other continuous or semi-continuous embodiments, the inert gas flows substantially concurrent relative to the direction of solids flow.

In some embodiments, the process includes monitoring and controlling the process with at least one reaction gas probe, such as two or more reaction gas probes. Monitoring and controlling the process can improve process energy efficiency. Monitoring and controlling the process can also improve a product attribute associated with the high-carbon biogenic reagent, such as (but not limited to) carbon content, energy content, structural integrity, or mechanical strength.

The process may further include thermal oxidation (i.e., combustion) of at least a portion of the condensable and non-condensable vapors with an oxygen-containing gas. The thermal oxidation may be assisted with combustion of natural gas. Heat produced from the thermal oxidation may be utilized, at least in part, for drying the feedstock. Additionally, heat produced from the thermal oxidation may be utilized, at least in part, to heat the substantially inert gas before entering one of the zones or reactors, such as the pyrolysis zone.

The process may further include combining at least a portion of the vapors with the cooled pyrolyzed solids, to increase the carbon content of the high-carbon biogenic reagent. Alternatively, or additionally, the process may further include combining at least a portion of the condensable vapors with the warm pyrolyzed solids, to increase the carbon content of the high-carbon biogenic reagent.

Condensable vapors may thus be used for either energy in the process (such as by thermal oxidation) or in carbon enrichment, to increase the carbon content of high-carbon biogenic reagent. Certain non-condensable gases, such as CO or $CH_4$, may be utilized either for energy in the process, or as part of the substantially inert gas for the pyrolysis step.

In some embodiments, the process further comprises introducing at least one additive selected from acids, bases, or salts thereof. The additive may be selected from (but not limited to) the group consisting of sodium hydroxide, potassium hydroxide, magnesium oxide, hydrogen bromide, hydrogen chloride, sodium silicate, potassium permanganate, and combinations thereof.

In some embodiments, the process further comprises introducing at least one additive selected from the group consisting of a metal, a metal oxide, a metal hydroxide, a metal halide, and combinations thereof. The additive may be selected from (but not limited to) the group consisting of magnesium, manganese, aluminum, nickel, chromium, silicon, boron, cerium, molybdenum, phosphorus, tungsten, vanadium, iron halide, iron chloride, iron bromide, magnesium oxide, dolomite, dolomitic lime, fluorite, fluorspar, bentonite, calcium oxide, lime, and combinations thereof.

Additives, including silicon dioxide or silica fume, may be added before, during, or after any one or more steps of the process, including into the feedstock itself at any time, before or after it is harvested. Additives may be introduced prior to or during step (b), prior to or during step (d), during step (f), during step (g), between steps (f) and (g), or after step (g), for example. An additive may be introduced to the warm pyrolyzed solids. For example, an additive may be introduced in an aqueous solution, vapor, or aerosol to assist with cooling of the warm pyrolyzed solids in step (g). In these or other embodiments, an additive is introduced to the cool pyrolyzed solids to form the high-carbon biogenic reagent containing the additive.

In some embodiments, the process further comprises introducing at least a portion of the cool pyrolyzed solids to a separate unit for additional pyrolysis, in the presence of a substantially inert gas for at least about 30 minutes and with a pyrolysis temperature selected from about 200° C. to about 600° C., to generate a solid product having higher carbon content than the cool pyrolyzed solids.

In some embodiments, the process further comprises operating a cooler to cool the warm pyrolyzed solids with steam, thereby generating the cool pyrolyzed solids and superheated steam; wherein the drying is carried out, at least in part, with the superheated steam derived from the external cooler. Optionally, the cooler may be operated to first cool the warm pyrolyzed solids with steam to reach a first cooler temperature, and then with air to reach a second cooler temperature, wherein the second cooler temperature is lower than the first cooler temperature and is associated with a reduced combustion risk for the warm pyrolyzed solids in the presence of the air.

In the processes disclosed herein, introducing silicon dioxide can comprise introducing silica fume. Silica fume is an ultrafine (comprising particles generally less than 1 μm in diameter) silica powder byproduct from silicon production, for example, in the production of silicon metal or ferrosilicon alloys, during which it is captured in baghouses. Silicon metal and alloys are produced in electric furnaces. Silica fume consists primarily of amorphous (non-crystalline) silicon dioxide.

In the processes disclosed herein, introducing silicon dioxide can comprise introducing raw silicon dioxide. For example, introducing silicon dioxide can comprise introducing river rock or quartz. Free silica occurs in many crystalline forms with a composition very close to that of silicon dioxide, e.g., 46.75% by weight being silicon and 53.25% oxygen. Quartz is by far the most commonly occurring form. Tridymite, cristobalite, and the hydrous silica mineral opal are uncommon, and vitreous (glassy) silica, coesite, and stishovite have been reported from only a few localities.

Silicon dioxide, whether introduced as silica fume or river rock, can be introduced into the process by adding silicon dioxide to cooled pyrolyzed solids after pyrolysis. Silicon dioxide, whether introduced as silica fume or river rock, can be introduced prior to pyrolysis, and the silicon dioxide can improve heat transfer thereby leading to the improved pyrolysis of biomass.

The silicon dioxide, as comprised within a raw material feedstock such as silica fume or river rock, that is introduced can be smaller than what has heretofore been used in a submerged arc or electric arc furnace. For example, the particle size of the silicon dioxide feedstock, whether river rock or silica fume, can be from about 0.01 mm to about 12 mm. For example, the particle size can be from about 0.01 mm to 12 mm, in increments of about 0.05 mm.

The process can further comprise pressing, binding, pelletizing, extruding, or agglomerating the composition.

The processes can further comprise densification, thereby producing, for example, a pellet shaped composition. Other shapes can be produced. For example, spheres. The proximity of the carbon and silicon dioxide in the densified composition results in more efficient conversion of the composition to silicon.

A densification process can create a final composition of materials. Densification allows materials to be mixed and blended in a controlled manner with other particles comprising a composition as described herein. A composition as described can be processed and forced through densification equipment. Such equipment can include commercially available machines. Densification equipment forces a composition through a shaping die, thereby producing, for example, a pellet. Faceplate temperature of the extrusion equipment typically is between about 72° C. (165° F.) and about 85° C. (185° F.). A pellet can exit at a temperature of about 43° C. (110° F.) and not greater than about 121° C. (250° F.). When a pellet exits the extruder, there can be a slight coating on the external surface of the pellet. This coating can comprise lignin, which is a naturally occurring substance of the cellulosic material. Pellets can then be transferred to the finished object conveyor/cooler.

Following formation, pellets can be cooled down by a cooling means including, but not limited to, an air cooler, an air conditioner, or liquid nitrogen. The cooling process causes the pellets to harden into the shape created by the extruder and allows components of the pellet to maintain their integrity. In one embodiment, pellets are placed through a shaker screen after sufficiently cooling and hardening. This separates fine and discrete particles. The discharge for the fine particles can be separated and can again be recycled or forced through an extruder. This can minimize the potential for waste generated by any excess particles that comprise a pellet.

A densification process can comprise: using an additive for improved densification; mixing of the additive, carbon, and silicon dioxide; extruding the mixture through a die to thereby produce pellets; and optionally drying the pellets.

A densification process can comprise: optionally using an additive, for example, bentonite, for improved densification from about 0.5% to about 15%, in increments of about 0.5%; optionally adding water, for example, from about 5% to about 50% water; mixing of the additive, carbon, and silicon dioxide; extruding the mixture through a die to thereby produce pellets; optionally heating or cooling the extruder and/or die plate to improve densification; optionally degassing the extruder; and optionally drying the pellets.

Extruders can also be used to shape and mix materials. Extrusion is a process used to create objects of a fixed cross-sectional profile. A material is pushed through a die of the desired cross-section. The two main advantages of this process over other manufacturing processes are its ability to create very complex cross-sections, and to work materials that are brittle, because the material only encounters compressive and shear stresses. It also forms products with an excellent surface finish. Extrusion may be continuous (theoretically producing indefinitely long material) or semi-continuous (producing many pieces). The extrusion process can be done with the material hot or cold. Various binders, coatings, and extrusion recipes can be used to achieve varying product attributes ranging from >99% on the "pellet durability index" to dust free to hydrophobicity. Die thickness, die taper, screw speed, moisture content, pre-compaction, product sizing, and numerous other variables can impact pellet quality. For example, if more moisture is used during extrusion, and the product is then dried, it is easier to apply a wax-based coating than if less water is used in extrusion.

Referring generally to FIGS. 1 to 13, block flow diagrams of a several exemplary multi reactor embodiments of the present disclosure are illustrated. Each figure is discussed in turn below. It should be appreciated FIGS. 1 to 13 represent some example embodiments but not all contemplated embodiments of the present disclosure. As discussed below, various additional non-illustrated embodiments and combinations of the several components and features discussed herein are also contemplated. As will be understood in the discussion below, any of the plurality of reactors discussed herein can be independent reactors, or alternatively within a single reactor BPU can include a plurality of zones, or a combination thereof. It should be appreciated that, although the figures each illustrate a different alternative embodiment, all other discussion in this disclosure can apply to each of the illustrated and non-illustrated embodiments.

Referring now generally to FIG. 1, a block flow diagram of a multi reactor embodiment of the present disclosure is illustrated. This embodiment can utilize two to a plurality of different reactors. Three reactors are shown in the illustrative embodiment; however, any different number of reactors could be employed. In one embodiment, each reactor is connected to at least one other reactor via a material transport unit 304 (shown in FIG. 3). In one embodiment, the material transport unit 304 controls atmosphere and temperature conditions.

Figure 3:
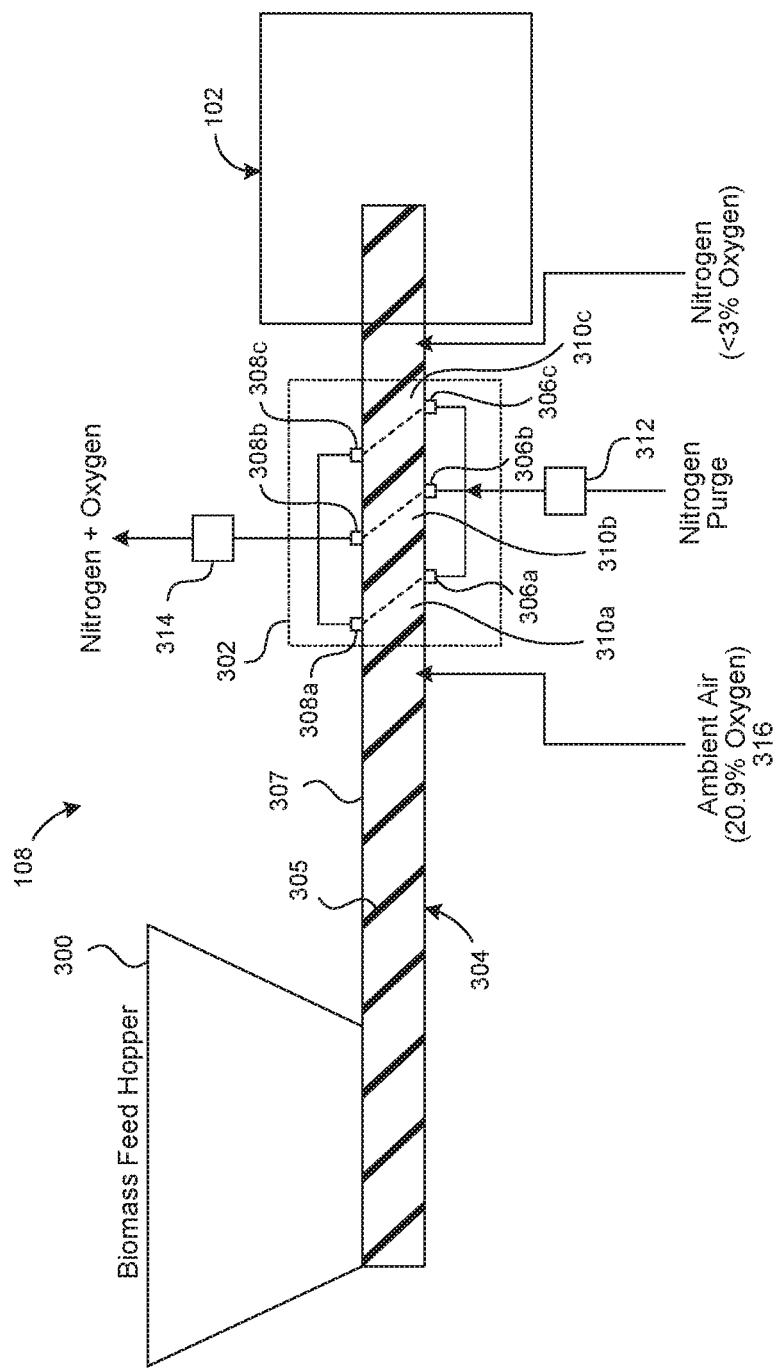
FIG. 3 depicts one embodiment of a zero-oxygen continuous feed mechanism suitable for use in connection with the present invention.

In the illustrated embodiment, the raw material 109, such as biomass, is optionally dried and sized outside the system and introduced into the first reactor 100 in a low-oxygen atmosphere, optionally through the use of a material feed system 108. As discussed in further detail below and as illustrated in FIG. 3, the material feed system 108 reduces the oxygen level in the ambient air in the system to not more than about 3%. The raw material 109 enters the first reactor 112 via the enclosed material transport unit 304 after the oxygen levels have been decreased in the first reactor. In one embodiment, the raw material transport unit will include an encapsulated jacket or sleeve through which steam and off-gases from the reactor are sent and used to pre-heat the biomass either directly or sent to a process gas heater and or heat exchanger and then sent and used to pre-heat or pyrolyze the biomass.

In the illustrated embodiment, the raw material 109 first travels from the material feed system 108 on the material transport unit 304 into the first reactor of the BPU 112.

As discussed in more detail below, in one embodiment, the first reactor 112 is configured to be connected to any other reactor in the system to recover waste heat 132 and conserve energy through a suitable waste heat recovery system. In one embodiment, the waste heat given off in the first reactor 112 is used to operate a steaming bin or another appropriate heating mechanism configured to dry raw materials 109 inside or outside of the system. In various embodiments, other byproducts of the waste heat, such as a substantially heated inert gas or the like, can be used elsewhere in the system to further enrich the material at any point along the process.

In the illustrated embodiment, the biomass 109 enters the first reactor 112, wherein the temperature is raised from the range of about ambient temperature to about 150° C. to a temperature of about 100° C. to about 200° C. In one embodiment, the temperature does not exceed 200° C. in the first reactor 112. As discussed in greater detail below, the first reactor 112 can include an output mechanism to capture and exhaust off-gases 120 from the biomass 123 while it is being heated. In one embodiment, the off-gases 120 are extracted for optional later use. In various embodiments, the heating source used for the various zones in the BPU 102 is electrical or gas. In one embodiment, the heating source used for the various reactors of the BPU 102 is waste gas from other reactors of the unit 102 or from external sources. In various embodiments, the heat is indirect.

Following preheating in the first reactor 112, the material transport unit 304 passes the preheated material 123 into the optional second reactor 114. In one embodiment reactor 114 is the same as reactor 112. In one embodiment where reactor 114 is different than reactor 112, the material transport unit 304 penetrates the second reactor 114 through a high-temperature vapor seal system (e.g. an airlock), which allows the material transport unit 304 to penetrate the second reactor while preventing gas from escaping. In one embodiment, the interior of the second reactor 114 is heated to a temperature of about 100° C. to about 600° C. or about 200° C. to about 600° C. In another embodiment, the second reactor 114 includes an output port similar to the first reactor 102 to capture and exhaust the gases 122 given off of the preheated material 123 while it is being carbonized. In one embodiment, the gases 122 are extracted for optional later use. In one illustrative embodiment, the off-gases 120 from the first reactor 112 and the off-gases 122 from the second reactor 114 are combined into one gas stream 124. Once carbonized, the carbonized biomass 125 exits the second reactor 114 and enters the third reactor 116 for cooling. Again, the third reactor can be the same reactor as 112 or 114 or different.

In one embodiment, when the biogenic reagent 125 enters the third reactor 116, the carbonized biomass 125 is allowed to cool (actively or passively) to a specified temperature range to form carbonized biomass 126, as discussed above. In one embodiment, temperature of the carbonized biomass 125 is reduced in the third reactor under substantially inert atmospheric conditions. In another embodiment, the third reactor cools the carbonized biomass 125 with an additional water-cooling mechanism. It should be appreciated that the carbonized biomass 126 is allowed to cool in the third reactor 116 to the point where it will not spontaneously combust if exposed to oxygenated air. In one such embodiment, the third reactor 116 reduces temperature of the carbonized biomass to below 200° C. In one embodiment, the third reactor includes a mixer (not shown) to agitate and uniformly cool the carbonized biomass. It should be appreciated that cooling may occur either directly or indirectly with water or other liquids; cooling may also occur either directly or indirectly with air or other cooled gases, or any combination of the above.

It should be appreciated that in several embodiments (not shown) one or more additional coolers or cooling mechanisms are employed to further reduce the temperature of the carbonized biomass. In various such embodiments, the cooler is separate from the other reactors 112, 114, 116, along the material transport system. In some embodiments, the cooler follows the reactors. In some embodiments, the cooler can be the same as the reactors 112, 114, 116. In other embodiments, the cooler is, for example, a screw, auger, conveyor (specifically a belt conveyor in one embodiment), drum, screen, pan, counterflow bed, vertical tower, jacketed paddle, cooled screw or combination thereof that cools either directly or indirectly with water or other liquids, or directly or indirectly with other gases, or combination of the above. In various embodiments, coolers could include water spray, cooled inert gas streams, liquid nitrogen, or ambient air if below ignition temperature. It should be appreciated that heat can be recovered from this step by capturing the flash steam generated by the water spray, or the superheated steam generated when saturated steam is introduced and heated by the carbonized biomass.

Figure 5:
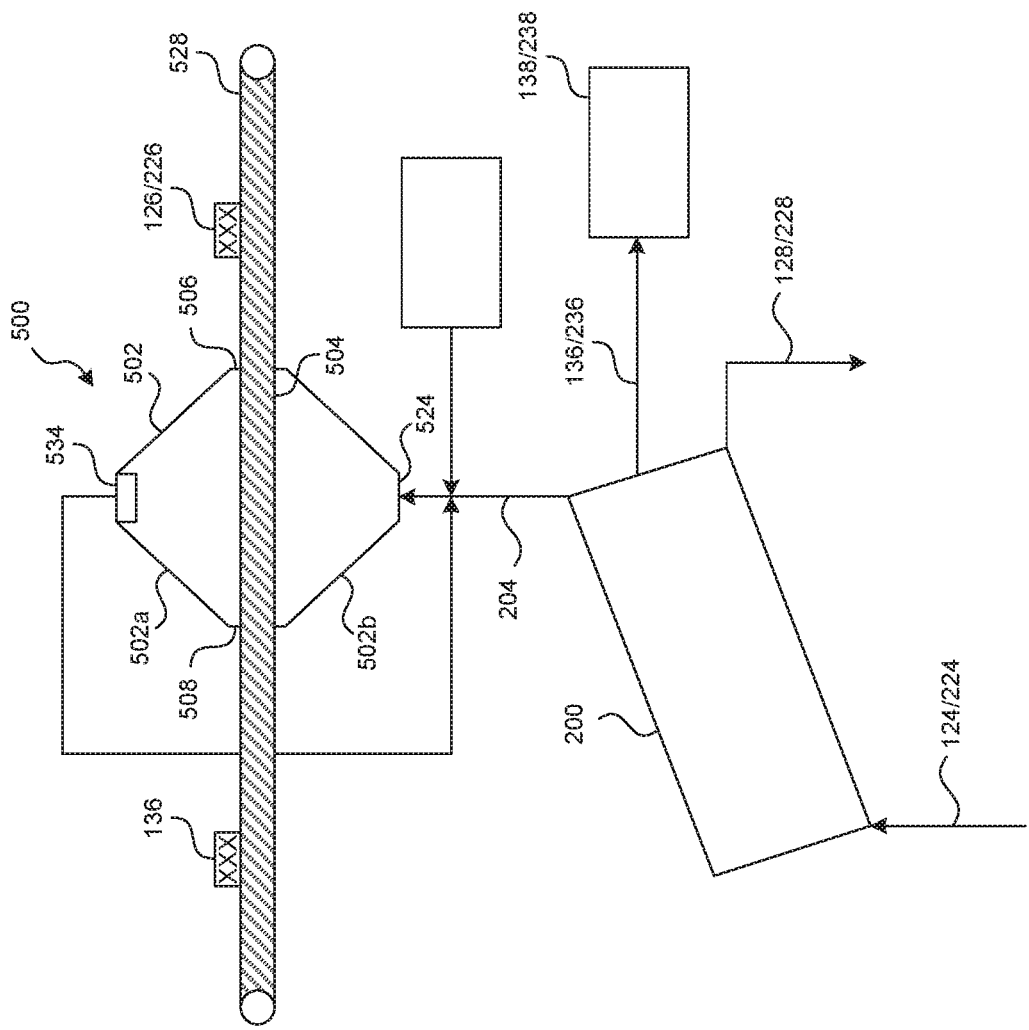
FIG. 5 depicts one embodiment of a carbon recovery unit suitable for use in connection with the present invention.

As illustrated in FIGS. 1 and 5, the gas-phase separator unit 200 includes at least one input and a plurality of outputs. The at least one input is connected to the exhaust ports on the first reactor 112 and the second reactor 114 of the BPU 102. One of the outputs is connected to the carbon recovery unit 104, and another one of the outputs is connected to collection equipment or further processing equipment such as an acid hydrogenation unit 106 or distillation column. In various embodiments, the gas-phase separator processes the off-gases 120, 122 from the first reactor 112 and the second reactor 114 to produce a condensate 128 and an enrichment gas 204. In various embodiments, condensables may be used for either energy recovery (134) (for example in the dryer, reactor or process gas heater), or for other carbon enrichment. In various embodiments, non-condensables (for example CO) may be used for energy recovery (134) (for example in a dryer, reactor or process gas heater), as an inert gas in the process (for example in the deaeration unit, reactor, BPU or cooler discussed in more detail below) or for carbon enrichment.

In various embodiments, the condensate 128 includes polar compounds, such as acetic acid, methanol and furfural. In another embodiment, the enrichment gas 204 produced by the gas-phase separator 200 includes at least non-polar gases, for example carbon monoxide, terpenes, methane, carbon dioxide, etc. In one embodiment, the gas-phase separator comprises a fractionation column. In one embodiment, acetic acid is sent via a line 128 to an optional acid hydrogenation unit. In another embodiment, methanol and/or furfural are sent via optional additional line(s) 136 to a distillation/processing unit 138

In various embodiments, as discussed in more detail below, the carbon recovery unit itself has the facility to enrich the material. In various other embodiments, the material is enriched in a material enrichment unit separate from the carbon recovery unit. It should be appreciated that, in some such embodiments, the carbon recovery unit is a vessel for storing the carbonized material, and the separate material enrichment unit is the unit in which gases are introduced to enrich the material.

In the illustrated embodiment, the carbon recovery unit 500 also enriches the carbonized biomass 126. The carbonized biomass 126 exits the third reactor along the material transport unit 304 and enters the carbon recovery unit 500. In various embodiments, as illustrated in more detail in FIG. 5 and discussed above, the carbon recovery unit 500 also includes an input 524 connected to the gas-phase separator 200. In one embodiment, the enrichment gas 204 is directed into the carbon recovery unit to be combined with the biogenic reagent 126 to create a high carbon biogenic reagent 136. In another embodiment, a carbon-enriched gas from an external source can also be directed to the carbon recovery unit to be combined with the carbonized biomass 126 to add additional carbon to the ultimate high carbon biogenic reagent produced. In various embodiments, the carbonized biomass 126 is temperature-reduced carbonized biomass. Illustratively, the system 100 can be co-located near a timber processing facility and carbon-enriched gas from the timber processing facility can be used as gas from an external source.

Figure 2:
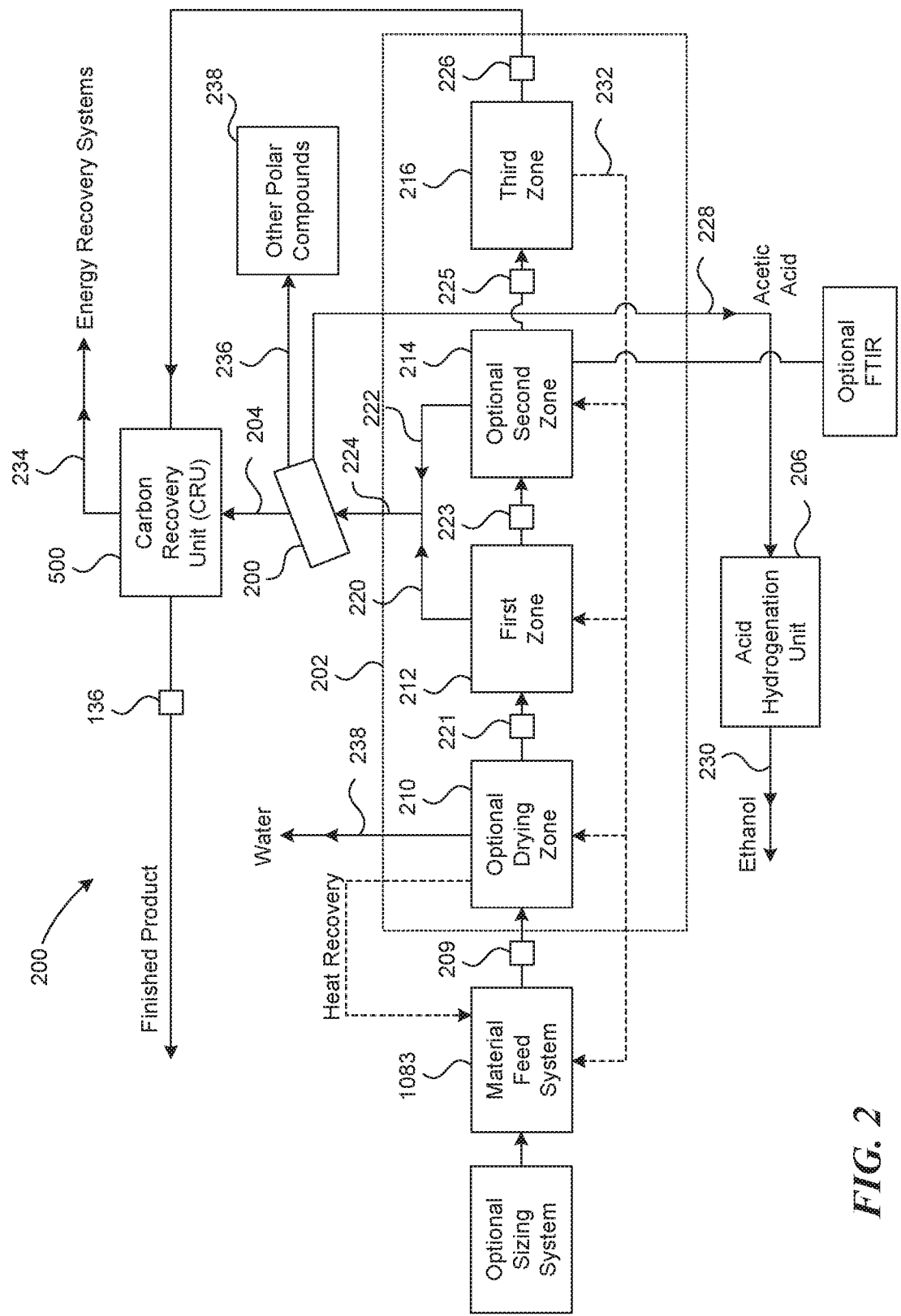
FIG. 2 depicts a single reactor, multi-zone embodiment of a system of the invention

Referring now generally to FIG. 2, a block flow diagram of a single reactor, multi-zone embodiment of the present disclosure is illustrated. In the illustrated embodiment, the raw material 209, such as biomass, is introduced into the reactor 200 in a low-oxygen atmosphere, optionally through the use of a material feed system 108 already described. As discussed in further detail below, the material feed system 108 reduces the oxygen level in the ambient air in the system to not more than about 3%. The raw material 209 enters the BPU 202 in an enclosed material transport unit 304 after the oxygen levels have been decreased. In one embodiment, the material transport unit will include an encapsulated jacket or sleeve through which steam and off-gases from the reactor 200 are sent and used to pre-heat the biomass.

In the illustrated embodiment, the raw material first travels from the material feed system 108 on the material transport unit 304 through an optional drying zone 210 of the BPU 202. In one embodiment, the optional drying zone 210 heats the raw material to remove water and other moisture prior to being passed along to the preheat zone 212. In one embodiment, the interior of the optional drying zone 210 is heated to a temperature of about ambient temperature to about 150° C. Water 238 or other moisture removed from the raw material 209 can be exhausted, for example, from the optional drying zone 210. In another embodiment, the optional drying zone is adapted to allow vapors and steam to be extracted. In another embodiment, vapors and steam from the optional drying zone are extracted for optional later use. As discussed below, vapors or steam extracted from the optional drying zone can be used in a suitable waste heat recovery system with the material feed system. In one embodiment, the vapors and steam used in the material feed system pre-heat the raw materials while oxygen levels are being purged in the material feed system. In another embodiment, biomass is dried outside of the reactor and the reactor does not comprise a drying zone.

As discussed in more detail below, in one embodiment, the optional drying zone 210 is configured to be connected to the cooling zone 216 to recover waste heat 232 and conserve energy through a suitable waste heat recovery system. In one embodiment, the waste heat given off in the cooling zone 216 is used to operate a heating mechanism configured to dry raw materials 209 in the optional drying zone 210. After being dried for a desired period of time, the dried biomass 221 exits the optional drying zone 210 and enters preheat zone 212.

In the illustrated embodiment, the dried biomass 221 enters the first (preheat) zone 212, wherein the temperature is raised from the range of about ambient temperature to about 150° C. to a temperature range of about 100° C. to about 200° C. In one embodiment, the temperature does not exceed 200° C. in the first/preheat zone 212. It should be appreciated that if the preheat zone 212 is too hot or not hot enough, the dried biomass 221 may process incorrectly prior to entering the second zone 214. As discussed in greater detail below, the preheat zone 212 can includes an output mechanism to capture and exhaust off gas 220 from the dried biomass 221 while it is being preheated. In another embodiment, the off-gases 220 are extracted for optional later use. In various embodiments, the heating source used for the various zones in the BPU 202 is electric or gas. In one embodiment, the heating source used for the various zones of the BPU 202 is waste gas from other zones of the unit 202 or from external sources. In various embodiments, the heat is indirect.

Following the preheat zone 212, the material transport unit 304 passes the preheated material 223 into the second (pyrolysis) zone 214. In one embodiment, the material transport unit 304 penetrates the second/pyrolysis zone through a high-temperature vapor seal system (such as an airlock, not shown), which allows the material transport unit 304 to penetrate the high-temperature pyrolysis zone while preventing (or minimizing) gas from escaping. In one embodiment, the interior of the pyrolysis zone 214 is heated to a temperature of about 100° C. to about 600° C. or about 200° C. to about 500° C. In another embodiment, the pyrolysis zone 214 includes an output port similar to the preheat zone 212 to capture and exhaust the gases 222 given off of the preheated biomass 223 while it is being carbonized. In one embodiment, the gases 222 are extracted for optional later use. In one illustrative embodiment, the off-gases 220 from the preheat zone 212 and the off-gases 222 from the pyrolysis zone 214 are combined into one gas stream 224. Once carbonized, the carbonized biomass 225 exits the second/pyrolysis zone 214 and enters the third/temperature reducing or cooling zone 216.

In one embodiment, when the carbonized biomass 225 enters the cooling zone 216, the carbonized biomass 225 is allowed to cool to a specified temperature range of about 20° C. to 25° C. (about room temperature) to become temperature-reduced carbonized biomass 226, as discussed above. In various embodiments, the BPU 202 includes a plurality of cooling zones. In one embodiment, the cooling zone 216 cools the carbonized biomass to below 200° C. In one embodiment, the cooling zone includes a mixer to agitate and uniformly cool the materials. In various embodiments, one or more of the plurality of cooling zones is outside of the BPU 202.

As illustrated in FIGS. 2 and 5, the gas-phase separator unit 200 includes at least one input and a plurality of outputs. In this illustrative embodiment, the at least one input is connected to the exhaust ports on the first/preheat zone 212 and the second/pyrolysis zone 214 of the BPU 202. One of the outputs is connected to the carbon recovery unit 500 (which is configured to enrich the material), and another one of the outputs is connected to collection equipment or further processing equipment such as an acid hydrogenation unit 206 or distillation column. In various embodiments, the gas-phase separator processes the off gases 220, 222 from the first/preheat zone 212 and the second/pyrolysis zone 214 to produce a condensate 228 and an enrichment gas 204. In one embodiment, the condensate 228 includes polar compounds, such as acetic acid, methanol and furfural. In one embodiment, the enrichment gas 204 produced by the gas-phase separator 200 includes at least non-polar gases. In one embodiment, the gas-phase separator comprises a fractionation column. In one embodiment, acetic acid is sent via a line 228 to an optional acid hydrogenation unit 206. In another embodiment, methanol and/or furfural are sent via optional additional line(s) 236 to a distillation/processing unit 238.

In the illustrated embodiments, the carbonized biomass exits the cooling reactor/zone along the material transfer unit 304 and enters the carbon recovery unit 500. In various embodiments, as illustrated in more detail in FIG. 5 and discussed above, the carbon recovery unit 500 also includes an input 524 connected to the gas-phase separator 200. In one embodiment, the enrichment gas 204 is directed into the carbon recovery unit 500 to be combined with the biogenic reagent 226 to create a high carbon biogenic reagent 136. In another embodiment, a carbon-enriched gas from an external source can also be directed to the carbon recovery unit 500 to be combined with the biogenic reagent 226 to add additional carbon to the biogenic reagent. In various embodiments, gases pulled from the carbon recovery unit 500 at reference 234 are optionally used in energy recovery systems and/or systems for further carbon enrichment. Similarly, in various embodiments, gases pulled from one or more zones of the BPU 202 are optionally used in energy recovery systems and/or systems for further carbon enrichment. Illustratively, the system 200 can be co-located near a timber processing facility and carbon-enriched gas from the timber processing facility can be used as gas from an external source.

Now referring generally to FIG. 3, one material feed system embodiment of the present disclosure is illustrated. As discussed above, high oxygen levels in the ambient air surrounding the raw material as it processes could result in undesirable combustion or oxidation of the raw material, which reduces the amount and quality of the final product. In one embodiment, the material feed system is a closed system and includes one or more manifolds configured to purge oxygen from the air surrounding the raw material. In one embodiment, oxygen level of about 0.5% to about 1.0% are used for pre-heating, pyrolyzing/carbonizing and cooling. It should be appreciated that a primary goal of the closed material feed system is to reduce oxygen levels to not more than about 3%, not more than about 2%, not more than about 1% or not more than about 0.5%. After the oxygen level is reduced, the biomass is transferred along the material feed system into the BPU. It should be appreciated that in various embodiments, pre-heating of inert gases through recovered process energy and subsequent introduction of pre-heated inert gases to the BPU, reactor or trimming reactor makes the system more efficient.

In some embodiments, a trimming reactor is included in the system. In one trimming reactor embodiment, pyrolyzed material from the BPU is fed into a separate additional reactor for further pyrolysis where heated inert gas is introduced to create a product with higher fixed carbon levels. In various embodiments, the secondary process may be conducted in a container such as a drum, tank, barrel, bin, tote, pipe, sack, press, or roll-off container. In various embodiments, the final container also may be used for transport of the carbonized biomass. In some embodiments, the inert gas is heated via a heat exchanger that derives heat from gases extracted from the BPU and combusted in a process gas heater.

As seen in FIG. 3, the closed material feed system 108 includes a raw material feed hopper 300, a material transport unit 304 and an oxygen purge manifold 302.

In one embodiment, the raw material feed hopper 300 is any suitable open-air or closed-air container configured to receive raw or sized/dried biomass 109/209. The raw material feed hopper 300 is operably connected with the material transport unit 304, which, in one embodiment, is a screw or auger system operably rotated by a drive source. In one embodiment, the raw material 109/209 is fed into the material transport unit 304 by a gravity feed system. It should be appreciated that the material transport unit 304 of FIG. 3 is fashioned such that the screw or auger 305 is enclosed in a suitable enclosure 307. In one embodiment, the enclosure 307 is substantially cylindrically shaped. In various embodiments, material feed systems include a screw, auger, conveyor, drum, screen, chute, drop chamber, pneumatic conveyance device, including a rotary airlock or a double or triple flap airlock.

As the raw material 109/209 is fed from the raw material feed hopper 300 to the material transport unit 304, the auger or screw 305 is rotated, moving the raw material 109/209 toward the oxygen purge manifold 302. It should be appreciated that, when the raw material 109/209 reaches the oxygen purge manifold 302, the ambient air among the raw material 109/209 in the material transport unit 304 includes about 20.9% oxygen. In various embodiments, the oxygen purge manifold 302 is arranged adjacent to or around the material transport unit 304. Within the oxygen fold manifold of one embodiment, the enclosure 307 of the material transport unit 304 includes a plurality of gas inlet ports 310a, 310b, 310c and a plurality of gas outlet ports 308a, 308b, 308c.

The oxygen purge manifold 302 has at least one gas inlet line 312 and at least one gas outlet line 314. In various embodiments, the at least one gas inlet line 312 of the oxygen purge manifold 302 is in operable communication with each of the plurality of gas inlet ports 310a, 310b, 310c. Similarly, in various embodiments, the at least one gas outlet line 314 of the oxygen purge manifold 302 is in operable communication with each of the plurality of gas outlet ports 308a, 308b, 308c. It should be appreciated that, in one embodiment, the gas inlet line 312 is configured to pump an inert gas into the gas inlet ports 310a, 310b, 310c. In one such embodiment, the inert gas is nitrogen containing substantially no oxygen. In one embodiment, the inert gas will flow counter-current to the biomass.

As will be understood, the introduction of inert gas 312 into the enclosed material transport unit 304 will force the ambient air out of the enclosed system. In operation, when the inert gas 312 is introduced to the first gas inlet port 310a of one embodiment, a quantity of oxygen-rich ambient air is forced out of outlet port 308a. It should be appreciated that, at this point, the desired level of not more than about 2% oxygen, not more than about 1% oxygen, not more than about 0.5% oxygen or not more than about 0.2% oxygen may not be achieved. Therefore, in various embodiments, additional infusions of the inert gas 312 must be made to purge the requisite amount of oxygen from the air surrounding the raw material 109 in the enclosed system. In one embodiment, the second gas inlet port 310b pumps the inert gas 312 into the enclosed system subsequent to the infusion at the first gas inlet port 310a, thereby purging more of the remaining oxygen from the enclosed system. It should be appreciated that, after one or two infusions of inert gas 312 to purge the oxygen 314, the desired level of less oxygen may be achieved. If, in one embodiment, the desired oxygen levels are still not achieved after two inert gas infusions, a third infusion of inert gas 312 at gas inlet 310c will purge remaining undesired amounts of oxygen 314 from the enclosed system at gas outlet 308c. Additional inlets/outlets may also be incorporated if desired. In various embodiments, oxygen levels are monitored throughout the material feed system to allow calibration of the amount and location of inert gas infusions.

In one alternative embodiment, heat, steam and gases recovered from the reactor are directed to the feed system where they are enclosed in jacket and separated from direct contact with the feed material, but indirectly heat the feed material prior to introduction to the reactor.

In one alternative embodiment, heat, steam and gases recovered from the drying zone of the reactor are directed to the feed system where they are enclosed in jacket and separated from direct contact with the feed material, but indirectly heat the feed material prior to introduction to the reactor.

It should be appreciated that the gas inlet ports 310a, 310b, 310c and the corresponding gas outlet ports 308a, 308b, 308c, respectively, of one embodiment are slightly offset from one another with respect to a vertical bisecting plane through the material transport unit 304. For example, in one embodiment, inlet port 310a and corresponding outlet port 308a are offset on material transport unit 304 by an amount that approximately corresponds with the pitch of the auger 305 in the material transport unit 304. In various embodiments, after the atmosphere surrounding the raw material 109/209 is satisfactorily de-oxygenated, it is fed from the material feed system 108 into the BPU 102. In various embodiments, oxygen levels are monitored throughout the material feed system to allow the calibration of the amount and location of inert gas infusions.

It should be appreciated that, in one embodiment, the raw material 109/209, and subsequently the dried biomass 221, preheated biomass 123/223, carbonized biomass 125/225 and carbonized biomass 126/226, travel through the reactor 102 (or reactors) along a continuous material transport unit 304. In another embodiment, the material transport unit carrying the material differs at different stages in the process. In one embodiment, the process of moving the material through the reactor, zones or reactors is continuous. In one such embodiment, the speed of the material transport unit 304 is appropriately calibrated and calculated by an associated controller and processor such that the operation of the material transport unit 304 does not require interruption as the material moves through the reactor or reactors.

In another embodiment, the controller associated with the reactor 102 or reactors (112/114/116) is configured to adjust the speed of the material transport unit 304 based on one or more feedback sensors, detected gas (e.g. from the optional FTIR), measured parameters, temperature gauges, or other suitable variables in the reactor process. It should be appreciated that, in various embodiments, any suitable moisture sensors, temperature sensors or gas sensors in operable communication with the controller and processor could be integrated into or between each of the zones/reactors or at any suitable position along the material transport unit 304. In one embodiment, the controller and processor use the information from sensors or gauges to optimize the speed and efficiency of the BPU 100/200. In one embodiment, the controller associated with the reactor 102 or reactors (112/114/116) is configured to operate the material transport unit 304. In one embodiment, the controller associated with the reactor 102 or reactors (112/114/116) is configured to monitor the concentration, temperature and moisture of the gas inside the material transport unit 304 or inside any of the reactors. In one embodiment, the controller is configured to adjust the speed of the material transport unit 304, the input of gases into the material transport unit and the heat applied to the material in the material transport unit based upon one or more readings taken by the various sensors.

Figure 4:
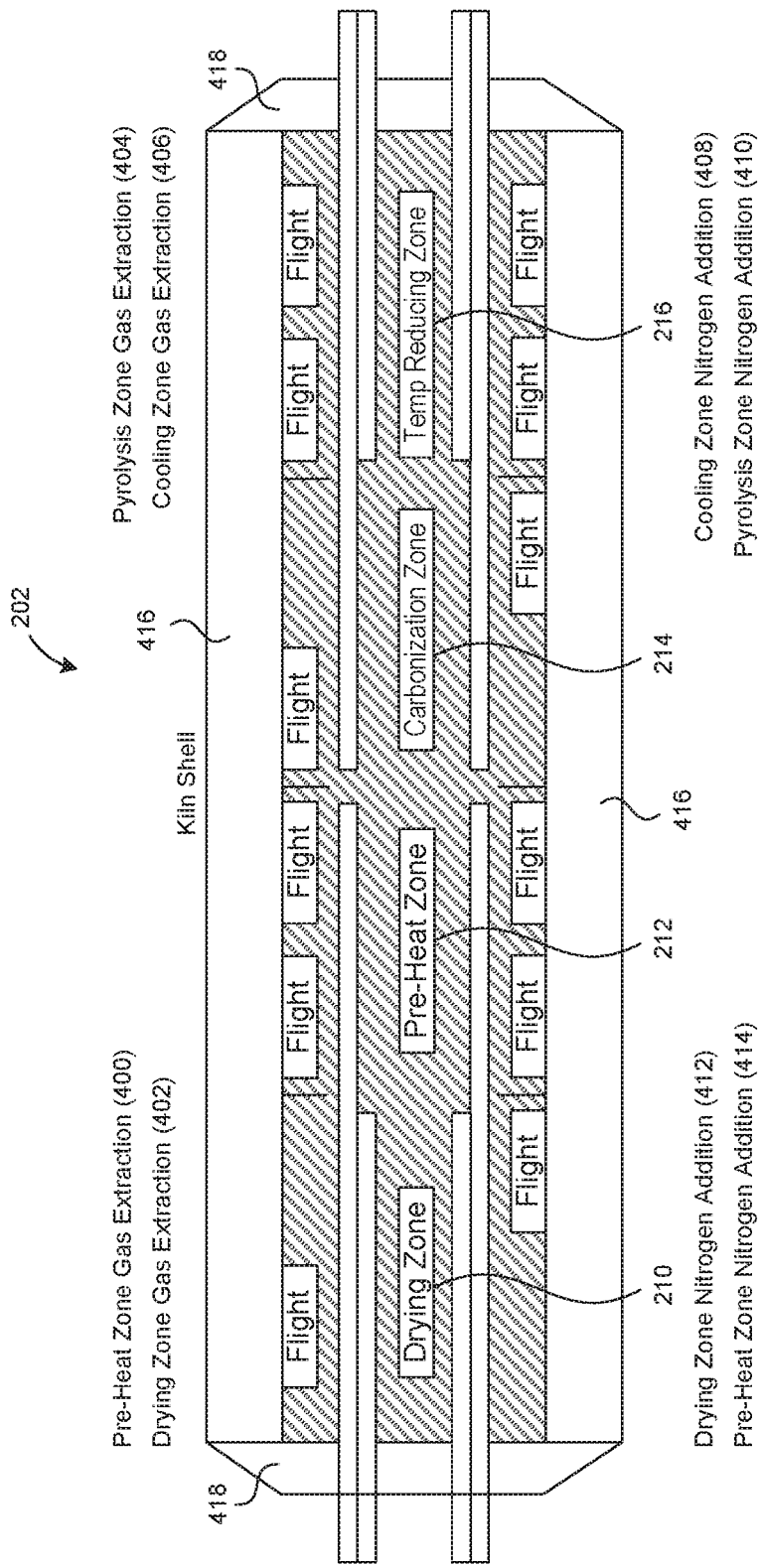
FIG. 4 depicts another embodiment of a single reactor, multi-zone biomass processing unit suitable for use in connection with the present invention.

Referring now to FIGS. 2 and 4, one embodiment of the BPU 102 is illustrated. It should be appreciated that the graphical representation of the BPU 202 in FIG. 4 corresponds substantially to the BPU 202 in FIG. 2. It should also be appreciated that, in various embodiments, the BPU 202 is enclosed in a kiln shell to control and manipulate the high amounts of heat required for the reactor process. As seen in FIG. 4, in one embodiment, the kiln shell of the BPU 202 includes several insulating chambers (416, 418) surrounding the four zones 210, 212, 214 and 216. In one embodiment, the kiln includes four separated zones. In various embodiments, each of the four zones 210, 212, 214 and 216 of the BPU 202 includes at least one inlet flight and at least one outlet flight. As discussed in greater detail below, within each zone of one such embodiment, the inlet and outlet flights are configured to be adjustable to control the flow of feed material, gas and heat into and out of the zone. A supply of inert air can be introduced into the inlet flight and the purged air can be extracted from the corresponding outlet flight. In various embodiments, one or more of the outlet flights of a zone in the BPU 202 are connected to one or more of the other inlet or outlet flights in the BPU.

In one embodiment, after the raw material 209 is de-oxygenated in the material feed system 108, it is introduced to the BPU 202, and specifically to the first of four zones the optional drying zone 210. As seen in FIG. 4, the drying zone includes inlet flight 422b and outlet flight 420a. In one embodiment, the drying zone is heated to a temperature of about 80° C. to about 150° C. to remove water or other moisture from the raw materials 209. The biomass is then moved to the second or pre-heat zone 212 where the biomass is pre-heated as described above.

In another embodiment, the material that has optionally been dried and pre-heated is moved to the third or carbonization zone. In one embodiment, carbonization occurs at a temperature from about 200° C. to about 700° C., for example about 200° C., about 210° C., about 220° C., about 230° C., about 240° C., about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., about 400° C., 410° C., about 420° C., about 430° C., about 440° C., about 450° C., about 460° C., about 470° C., about 480° C., about 490° C., about 500° C., about 510° C., about 520° C., about 530° C., about 540° C., about 550° C., about 560° C., about 570° C., about 580° C., about 590° C., about 600° C., about 610° C., about 620° C., about 630° C., about 640° C., about 650° C., about 660° C., about 670° C., about 680° C., about 690° C., or about 700° C. In another embodiment, a carbonization zone of a reactor 421 is adapted to allow gases produced during carbonization to be extracted. In another embodiment, gases produced during carbonization are extracted for optional later use. In one embodiment, a carbonization temperature is selected to minimize or eliminate production of methane ($CH_4$) and maximize carbon content of the carbonized biomass.

In another embodiment, carbonized biomass is moved to a temperature reducing or cooling zone (third zone) and is allowed to passively cool or is actively cooled. In one embodiment, carbonized biomass solids are cooled to a temperature ±10, 20, 30 or 40° C. of room temperature.

In various embodiments, the BPU includes a plurality of gas introduction probes and gas extraction probes. In the embodiment of the BPU illustrated in FIG. 4, the BPU further includes a plurality of gas introduction probes: 408, 410, 412 and 414, and a plurality of gas extraction probes: 400, 402, 404 and 406. It should be appreciated that, in various embodiments, one of each gas introduction probes and one of each gas extraction probes correspond with a different one of the plurality of zones 210, 212, 214 and 216. It should also be appreciated that, in various alternative embodiments, the BPU 202 includes any suitable number of gas introduction probes and gas extraction probes, including more than one gas introduction probes and more than one gas extraction probes for each of the plurality of zones.

In the illustrated embodiment, the drying zone 210 is associated with gas introduction probe 412 and gas extraction probe 402. In one embodiment, the gas introduction probe 412 introduces nitrogen to the drying zone 210 and the gas extraction probe 402 extracts gas from the drying zone 210. It should be appreciated that, in various embodiments, the gas introduction probe 412 is configured to introduce a mixture of gas into the drying zone 210. In one embodiment, the gas extracted is oxygen. It should be appreciated that, in various embodiments, the gas extraction probe 402 extracts gases from the drying zone 210 to be reused in a heat or energy recovery system, as described in more detail above.

In the illustrated embodiment, the pre-heat zone 212 is associated with gas introduction probe 414 and gas extraction probe 400. In one embodiment, gas introduction probe 414 introduces nitrogen to the pre-heat zone 212 and gas extraction probe 400 extracts gas from the pre-heat zone 212. It should be appreciated that, in various embodiments, the gas introduction probe 414 is configured to introduce a mixture of gas into the pre-heat zone 212. In various embodiments, the gas extracted in gas extraction probe 400 includes carbon-enriched off-gases. It should be appreciated that in one embodiment, as discussed above, the gases extracted from the pre-heat zone 212 and pyrolysis zone 214 are reintroduced to the material at a later stage in the process, for example in the carbon recovery unit. In various embodiments, the gases extracted from any of the zones of the reactor are used for either energy recovery in the dryer or process gas heater, for further pyrolysis in a trimming reactor, or in the carbon enrichment unit.

In the illustrated embodiment, the pyrolysis zone 214 is associated with gas introduction probe 410 and gas extraction probe 404. In one embodiment, gas introduction probe 410 introduces nitrogen to the pyrolysis zone 214 and gas extraction probe 404 extracts gas from the pyrolysis zone 214. It should be appreciated that, in various embodiments, the gas introduction probe 410 is configured to introduce a mixture of gas into the pyrolysis zone 214. In various embodiments, the gas extracted in the gas extraction probe 404 includes carbon-enriched off-gases. It should be appreciated that in one embodiment, as discussed above, the carbon-enriched gases extracted from the pyrolysis zone 214 are used and reintroduced to the material at a later stage in the process. In various embodiments, as described in more detail below, the extracted gas 400 from the pre-heat zone 212 and the extracted gas 404 from the pyrolysis zone 214 are combined prior to being reintroduced to the material.

In the illustrated embodiment, the cooling zone 116 is associated with gas introduction probe 408 and gas extraction probe 406. In one embodiment, gas introduction probe 408 introduces nitrogen to the cooling zone 116 and gas extraction probe 406 extracts gas from the cooling zone 116. It should be appreciated that, in various embodiments, the gas introduction probe 408 is configured to introduce a mixture of gas into the cooling zone 116. It should be appreciated that, in various embodiments, the gas extraction probe 406 extracts gases from the cooling zone 116 to be reused in a heat or energy recovery system, as described in more detail above.

It should be appreciated that the gas introduction probes and gas extraction probes of various embodiments described above are configured to operate with the controller and plurality of sensors discussed above to adjust the levels and concentrations of gas being introduced to and gas being extracted from each zone.

In various embodiments, the gas introduction probes and gas extraction probes are made of a suitable pipe configured to withstand high temperature fluctuations. In one embodiment, the gas introduction probes and gas extraction probes include a plurality of openings through which the gas is introduced or extracted. In various embodiments, the plurality of openings is disposed on the lower side of the inlet and gas extraction probes. In various embodiments, each of the plurality of openings extends for a substantial length within the respective zone.

In one embodiment, the gas introduction probes extend from one side of the BPU 202 through each zone. In one such embodiment, each of the four gas introduction probes extend from a single side of the BPU to each of the respective zones. In various embodiments, gaseous catalysts are added that enrich fixed carbon levels. It should be appreciated that, in such an embodiment, the plurality of openings for each of the four gas introduction probes are only disposed in the respective zone associated with that particular gas introduction probe.

For example, viewing FIG. 4, if each of the gas introduction probes extends from the left side of the drying zone into each one of the zones, all four gas introduction probes would travel through the drying zone, with the drying zone gas introduction probes terminating in the drying zone. The three remaining gas introduction probes would all travel through the pre-heat zone, with the pre-heat zone gas introduction probe terminating in the pre-heat zone. The two remaining gas introduction probes would travel through the pyrolysis zone, with the pyrolysis zone gas introduction probe terminating in the pyrolysis zone. The cooling zone gas introduction probe would be the only gas introduction probe to travel into and terminate in the cooling zone. It should be appreciated that in various embodiments, the gas extraction probes are configured similar to the gas introduction probes described in this example. It should also be appreciated that the gas introduction probes and gas extraction probes can each start from either side of the BPU.

In various embodiment, the gas introduction probes are arranged concentrically with one another to save space used by the multiple-port configuration described in the example above. In one such embodiment, each of the four inlet probes/ports would have a smaller diameter than the previous inlet probe/port. For example, in one embodiment, the drying zone gas introduction probe has the largest interior diameter, and the pre-heat zone gas introduction probe is situated within the interior diameter of the drying zone inlet probe/port, the pyrolysis zone gas introduction probe is then situated within the interior diameter of the pre-heat zone gas introduction probe and the cooling zone gas introduction probe is situated within the pyrolysis zone gas introduction probe. In one example embodiment, a suitable connector is attached to each of the four gas introduction probes outside of the BPU 102 to control the air infused into each of the four gas introduction probes individually.

In one such embodiment, similar to the example above, the drying zone gas introduction probe would terminate in the drying zone, and the three other gas introduction probes would continue onto the preheat zone. However, with a concentric or substantially concentric arrangement, only the outer-most gas introduction probe is exposed in each zone before being terminated. Therefore, in one such embodiment, the individual zone gas introductions are effectively controlled independent of one another, while only requiring one continuous gas introduction probe line. It should be appreciated that a similar concentric or substantially concentric configuration is suitably used for the gas extraction probes in one embodiment.

In one embodiment, each zone or reactor is adapted to extract and collect off-gases from one or more of the individual zones or reactors. In another embodiment, off-gases from each zone/reactor remain separate for disposal, analysis and/or later use. In various embodiments, each reactor/zone contains a gas detection system such as an FTIR that can monitor gas formation within the zone/reactor. In another embodiment, off-gases from a plurality of zones/reactors are combined for disposal, analysis and/or later use, and in various embodiments, off gases from one or more zones/reactors are fed to a process gas heater. In another embodiment, off-gases from one or more zones/reactors are fed into a carbon recovery unit. In another embodiment, off-gases from one or more zones/reactors are fed to a gas-phase separator prior to introduction in the carbon recovery unit. In one embodiment, a gas-phase separator comprises a fractionation column. Any fractionation column known to those skilled in the art may be used. In one embodiment, off-gases are separated into non-polar compounds and polar compounds using a standard fractionation column heated to a suitable temperature, or a packed column. In another embodiment, non-polar compounds or enriched gases from a gas-phase separator are extracted for optional later use, and in various embodiments, off gases from one or more zones/reactors are fed to a process gas heater. In one embodiment, gases extracted from the pre-heat zone/reactor, the pyrolysis zone/reactor and optionally the cooling zone/reactor are extracted into a combined stream and fed into the gas-phase separator. In various embodiments, one or more of the zones/reactors is configured to control whether and how much gas is introduced into the combined stream.

As discussed above and generally illustrated in FIG. 5, the off-gases 124/224 from the BPU 102/202 are directed into the gas-phase separator 200. In various embodiments, the off-gases 124/224 include the extracted gases 120 from the first/preheat zone/reactor 112/212 combined with the extracted gases 122/222 from the second/pyrolysis zone/reactor 114/214 or either gas stream alone. When the off-gases 124/224 enter the gas-phase separator 200, the off-gases 124/224 are separated into polar compounds 128/228/136/236 and non-polar compounds 204, such as non-polar gases. In various embodiments, the gas-phase separator 200 is a known fractionation column.

In various embodiments, the enriched gases 204 extracted from the combined off-gases 124/224 are directed from the gas-phase separator 200 into the carbon recovery unit 500 via input 524, which enriches the material. As discussed above, and as illustrated in FIGS. 8 and 11, it should be appreciated that in various embodiments, the extracted gases are first introduced into a material enrichment unit, and then into a separate carbon recovery unit. In the embodiment illustrated in FIG. 5, the material enrichment takes place in the carbon recovery unit 500. In one embodiment (FIG. 5), the gas-phase separator 200 includes a plurality of outputs. In various embodiments, one output from the gas-phase separator 200 is connected to the carbon recovery unit 500 to introduce an enriched gas stream to the carbon recovery unit 500. In one embodiment, a portion of the enriched gas stream is directed to the carbon recovery unit 500 and another portion is directed to a scrubber, or another suitable purifying apparatus to clean and dispose of unwanted gas. In various embodiments, off-gases that are not sent to the carbon recovery unit may be used for either energy recovery (for example in a process gas heater) or as an inert gas (for example in the deaeration unit, reactor, BPU, or cooler). Similarly, in various embodiments, off-gases from the carbon recovery unit may be used for either energy recovery (for example in a process gas heater), as an inert gas (for example in the deaeration unit, reactor, BPU, or cooler), or in a secondary recovery unit.

In one embodiment, another output from the gas-phase separator extracts polar compounds, optionally condensing them into a liquid component, including a plurality of different liquid parts. In various embodiments, the liquid includes water, acetic acid, methanol and furfural. In various embodiments, the outputted liquid is stored, disposed of, further processed, or re-used. For example, it should be appreciated that the water outputted in one embodiment can be re-used to heat or cool another portion of a system. In another embodiment, the water is drained. It should also be appreciated that the acetic acid, methanol and furfural outputted in one embodiment can be routed to storage tanks for re-use, re-sale, distillation or refinement.

As seen in FIG. 5, the carbon recovery unit 500 of one embodiment comprises a housing with an upper portion and a lower portion. It should be appreciated that, in various embodiments in which a material enrichment unit is separate from the carbon recovery unit, the material enrichment unit includes features similar to those discussed with respect to the carbon recovery unit 500 of FIG. 5. In one embodiment, the carbon recovery unit, comprises: a housing 502 with an upper portion 502a and a lower portion 502b; an inlet 524 at a bottom of the lower portion of the housing configured to carry reactor off-gas; an outlet 534 at a top of the upper portion of the housing configured to carry a concentrated gas stream; a path 504 defined between the upper portion and lower portion of the housing; and a transport system 528 following the path, the transport system configured to transport reagent, wherein the housing is shaped such that the reagent adsorbs at least some of the reactor off-gas. In various embodiments, the upper portion includes a plurality of outlets and the lower portion includes a plurality of inlets.

In one embodiment, the housing 502 is substantially free of corners having an angle of 110 degrees or less, 90 degrees or less, 80 degrees or less or 70 degrees or less. In one embodiment, the housing 502 is substantially free of convex corners. In another embodiment, the housing 502 is substantially free of convex corners capable of producing eddies or trapping air. In another embodiment, the housing 502 is substantially shaped like a cube, rectangular prism, ellipsoid, a stereographic ellipsoid, a spheroid, two cones affixed base-to-base, two regular tetrahedrons affixed base-to-base, two rectangular pyramids affixed base-to-base or two isosceles triangular prisms affixed base-to-base.

In one embodiment, the upper portion 502a and lower portion 502b of the housing 502 are each substantially shaped like a half-ellipsoid, half rectangular prism, half-stereographic ellipsoid, a half-spheroid, a cone, a regular tetrahedron, a rectangular pyramid, an isosceles triangular prism or a round-to-rectangular duct transition.

In another embodiment, the inlet 524 at the bottom of the lower portion of the housing 502b and the outlet 534 at the top of the upper portion of the housing 502a are configured to connect with a pipe. In another embodiment, the top of the lower portion of the housing 502b and the bottom of the upper portion of the housing 502a are substantially rectangular, circular or elliptical. In another embodiment, the width between the top of the lower portion of the housing 502b and the bottom of the upper portion of the housing 502a is wider than a width of the transport system 528. In one embodiment, the width of the transport system 528 is its height.

In one embodiment, the carbon recovery unit 500 comprises a path 504 defined between the upper portion and the lower portion, an inlet opening 506 and an outlet opening 508. In one embodiment, the inlet opening, and outlet opening are configured to receive the transport system. In one embodiment, the transport system 528 is at least semi-permeable or permeable to the enriching gas.

In one embodiment, the inlet opening 506 includes an inlet opening sealing mechanism to reduce escape of gas and the outlet opening 508 includes an outlet opening sealing mechanism to reduce escape of gas. In one embodiment, the inlet and outlet opening sealing mechanisms comprise an airlock.

In various embodiments, the lower portion 502b of the housing of the carbon recovery unit has a narrow round bottom connection opening, which is connected to the gas phase separator 200 for the transport of gas stream 204. In various embodiments, the top of the lower portion 502b of the housing of the carbon recovery unit 500 is substantially rectangular in shape, and substantially wider than the narrow round bottom connection opening. It should be appreciated that in one embodiment, the lower portion transitions from the round bottom opening to a rectangular top opening. In one embodiment, the rectangular top opening of the lower portion is about six feet wide (along the direction of the conveyor system). In various embodiments, the top portion of the carbon recovery unit 500 is shaped substantially similarly to the lower portion. In one embodiment, the lower opening of the top portion is wider than the top opening of the lower portion. In one embodiment, the rectangular lower opening of the top portion is about six and a half feet wide (along the direction of the conveyor system). In one embodiment, the top portion is configured to capture all gases passed through the carbon recovery unit 500 that are not adsorbed by the porous materials.

It should be appreciated that, in various embodiments, the shape of the lower portion of the carbon recovery unit aids in slowing down and dispersing the gases 204 across a wider surface area of the conveyor carrying the biogenic reagent 126/226. In various embodiments, the precise shape of the lower 502b and upper 502a portions of the carbon recovery unit 500 depend upon the angle of gas dispersion coming from the gas-phase separator pipe. It should be appreciated that in various embodiments, the gas naturally will tend to expand as it is pumped up at a flared range of between 5 and 30 degrees from the vertical. In one embodiment, the flare angle is approximately 15 degrees. It should be appreciated that the lower portion of the carbon recovery unit is constructed with as few creases and corners as possible to prevent the trapping of air or formation of eddies.

In one embodiment, the carbon recovery unit 500 is configured to connect to the gas-phase separator 200 as discussed above, as well as the BPU 102/202. In various embodiments, the carbon recovery unit 500 is connected to the output of the cooling reactor/zone 216/116, or the last cooling zone of the BPU 102/202 or outside of the BPU. In one embodiment, the output of the cooling reactor/zone 116/216 includes biogenic reagent that have been processed in the BPU 102/202. In one embodiment, the biogenic reagent 126/226 enter the carbon recovery unit 500 along a suitable transport system. In various embodiments, the top portion and the bottom portion of the carbon recovery unit are connected to one another and define a pathway through which a transport system passes. In one embodiment, the transport system is constructed with a porous or mesh material configured to allow gas to pass there through. It should be appreciated that the transport system is configured to pass through an opening of the carbon recovery unit 500 and then through an exit opening in the carbon recovery. In some embodiments, the entrance and the exit into and out of the carbon recovery unit are appropriately sealed with an airlock or another suitable sealing mechanism to prevent gases from escaping through the conveyor opening. In various embodiments, off-gases that are not sent to the carbon recovery unit may be used for either energy recovery (for example in a process gas heater) or as an inert gas (for example in the deaeration unit, reactor, BPU, or cooler). Similarly, in various embodiments, off-gases from the carbon recovery unit may be used for either energy recovery (for example in a process gas heater), as an inert gas (for example in the deaeration unit, reactor, BPU, or cooler), or in a secondary recovery unit.

In various embodiments, the process operates by first outputting the biogenic reagent 126/226 from the cooling zone 116/216 onto the transport system using a suitable discharge mechanism from the cooling reactor/zone 116/216. In one embodiment, the biogenic reagent 126/216 are spread across the width of the transport system to minimize material stacking or bunching and maximize surface area for gaseous absorption. At the point which the biogenic reagent 126/216 are deposited and suitably spread onto the transport system, in various embodiments, the transport system transports the biogenic reagent 126/216 through the opening in the carbon recovery unit 104 defined between the lower portion and the top portion discussed above. In the carbon recovery unit 104, the biogenic reagent 126/216 adsorb gases piped into the lower portion of the carbon recovery unit 104 from the gas-phase separator 200. After the biogenic reagent is enriched with non-polar gases, it should be appreciated that the biogenic reagent becomes a high carbon biogenic reagent. In various embodiments, the high carbon biogenic reagent is a final product of the process disclosed herein and is transported away from the carbon recovery unit 104 into a suitable storage or post-processing apparatus.

In one embodiment, after the enriched gases 204 pass through the conveyor and the biogenic reagent 126/216, the resulting gas is extracted at the top portion of the carbon recovery unit 104. In various embodiments, the exhausted gases 134 are carried away to a suitable scrubber, stack or recovery system. In some embodiments, the exhaust gases are exploited for any reusable qualities in the system, including usage in a secondary carbon recovery unit or for energy. In various embodiments, off-gases that are not sent to the carbon recovery unit may be used for either energy recovery (for example in a process gas heater) or as an inert gas (for example in the deaeration unit, reactor, BPU, or cooler). Similarly, in various embodiments, off-gases from the carbon recovery unit may be used for either energy recovery (for example in a process gas heater), as an inert gas (for example in the deaeration unit, reactor, BPU, or cooler), or in a secondary recovery unit.

It should be appreciated that the biogenic reagent 126/216 include a high amount of carbon, and carbon has a high preference for adsorbing non-polar gases. It should also be appreciated that the enriched gas stream 204 includes primarily non-polar gases like terpenes, carbon monoxide, carbon dioxide and methane. In various embodiments, as the enriched gases are directed from the gas-phase separator into the carbon recovery unit, the gas flow rate and the conveyor speed are monitored and controlled to ensure maximum absorption of the non-polar gases in the biogenic reagent 126/216. In another embodiment, the high-energy organic compounds comprise at least a portion of the enriched gases 204 eluted during carbonization of the biomass and outputted from the gas-phase separator 200 to the carbon recovery unit 104. In various embodiments, the enriched gases 204 are further enriched with additional additives prior to being introduced to the carbon recovery unit or material enrichment unit.

As discussed in more detail below, in various embodiments, the residence time of the biogenic reagent 126/216 in the carbon recovery unit is controlled and varies based upon the composition of the biogenic reagent 126/216 and gas flow and composition. In one embodiment, the biogenic reagent is passed through one or more carbon recovery units more than one time. In various embodiments, the output of enriched air from the gas-phase separator and the output of exhausted air from the carbon recovery unit 104 can be diverted or bifurcated into an additional carbon recovery unit or further refined or used for energy or inert gas for use in the process.

Referring more generally to FIGS. 6 to 13, various embodiments of the present disclosure are illustrated and discussed. It should be appreciated that the various embodiments and alternatives discussed below with respect to FIGS. 6 to 13 apply to the embodiments of FIGS. 1 to 5 discussed above, and vice versa.

Figure 6:
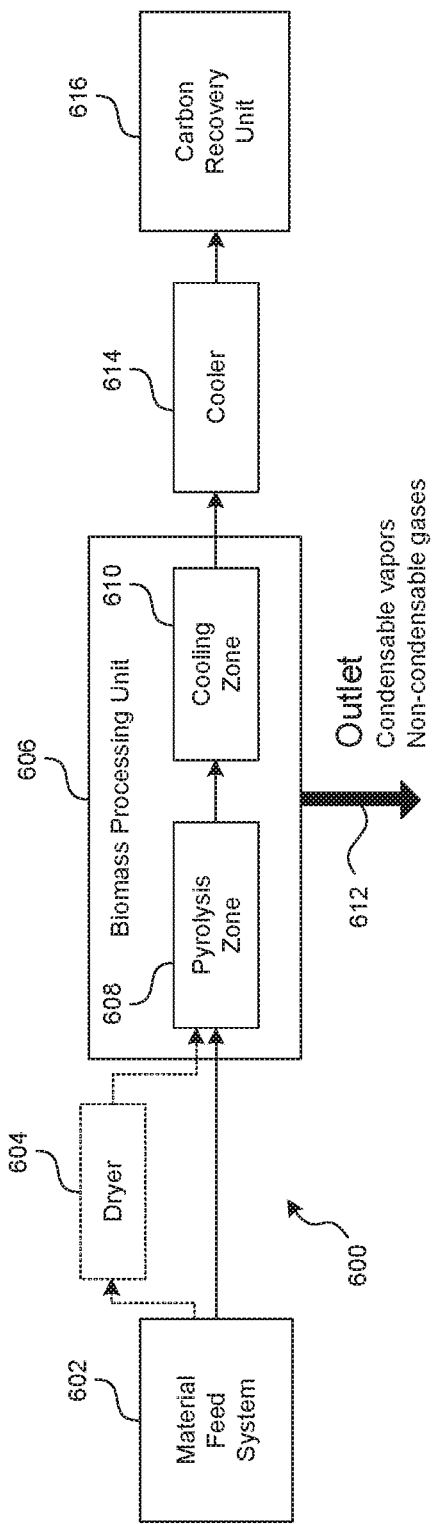
FIG. 6 depicts an embodiment of one embodiment of a single-reactor biomass processing unit of the present invention with an optional dryer.

Referring specifically now to FIG. 6, this embodiment can utilize a BPU including a single reactor having two to a greater plurality of different zones. Two zones are shown in the illustrative embodiment; however, any different number of zones could be employed. In one embodiment, each zone is connected to at least one other zone via a material transport unit (not pictured). In one embodiment, the material transport unit controls atmosphere and temperature conditions.

Specifically, in one embodiment illustrated in FIG. 6, the system 600 includes a material feed system 602, a BPU 606 including a pyrolysis zone 608 and a cooling zone 610, a cooler 614 and a carbon recovery unit 616. It should be appreciated that the cooler 614 of FIG. 6 is outside of the BPU 606 and is in addition to the cooling zone 610 that resides within the BPU 606.

In various embodiments, the system 600 includes an optional dryer between the material feed system 602 and the BPU 606. In various embodiments, the BPU 606 includes a plurality of zones. In FIG. 6, the BPU 606 includes a pyrolysis zone 608 and a cooling zone 610. The BPU 606 also includes at least a plurality of inlets and outlets for adding substances to and removing various substances from the plurality of zone 608, 610, including at least condensable vapors and non-condensable gases 612. It should be appreciated that in various embodiments discussed below, one or more of the pluralities of zone 608 or 610 are enclosed by the BPU 606.

Figure 7:
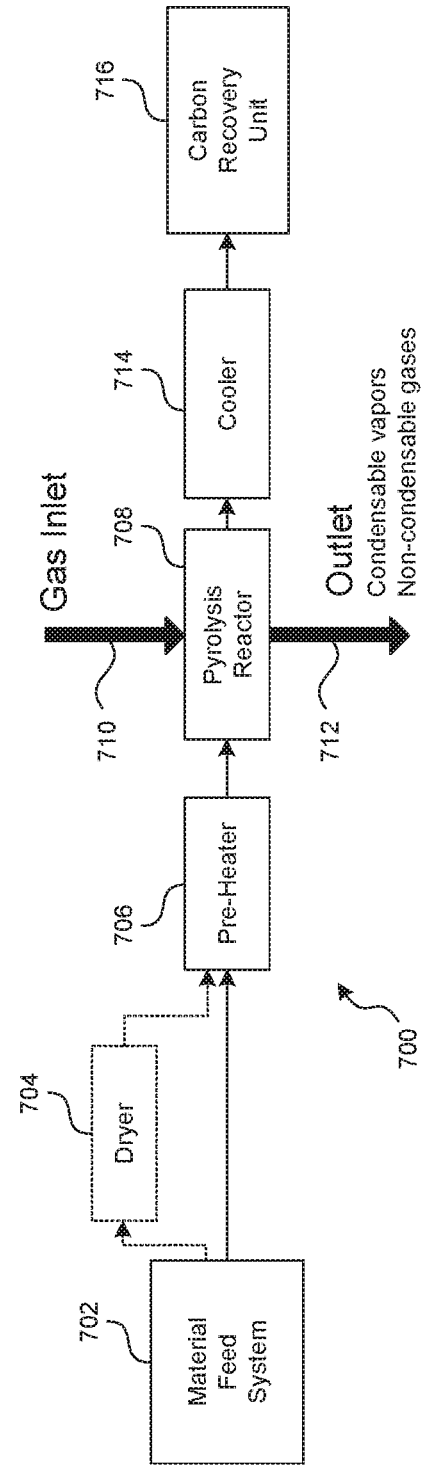
FIG. 7 depicts a pyrolysis reactor system embodiment of the invention with an optional dryer and a gas inlet.

Referring now to FIG. 7, a system 700 of one embodiment is illustrated and discussed. System 700 includes a single-reactor system, including a material feed system 702, a pre-heater 706, a pyrolysis reactor 708, a cooler, 714 and a carbon recovery unit 716. In various embodiments, the system 700 includes an optional dryer 704 between the material feed system 702 and the pre-heater 706. As seen in FIG. 7, the pyrolysis reactor 708 of one embodiment includes at least one gas inlet 710 and at least one outlet 712 for outputting substances from the pyrolysis reactor 708. In various embodiments, the substances outputted through outlet 712 include condensable vapors and/or non-condensable gases. It should be appreciated that the pyrolysis reactor 708 can include one or more zones, not discussed in detail herein. In various embodiments, the system 700 includes one or more reactors in addition to the pyrolysis reactor 708.

Figure 8:
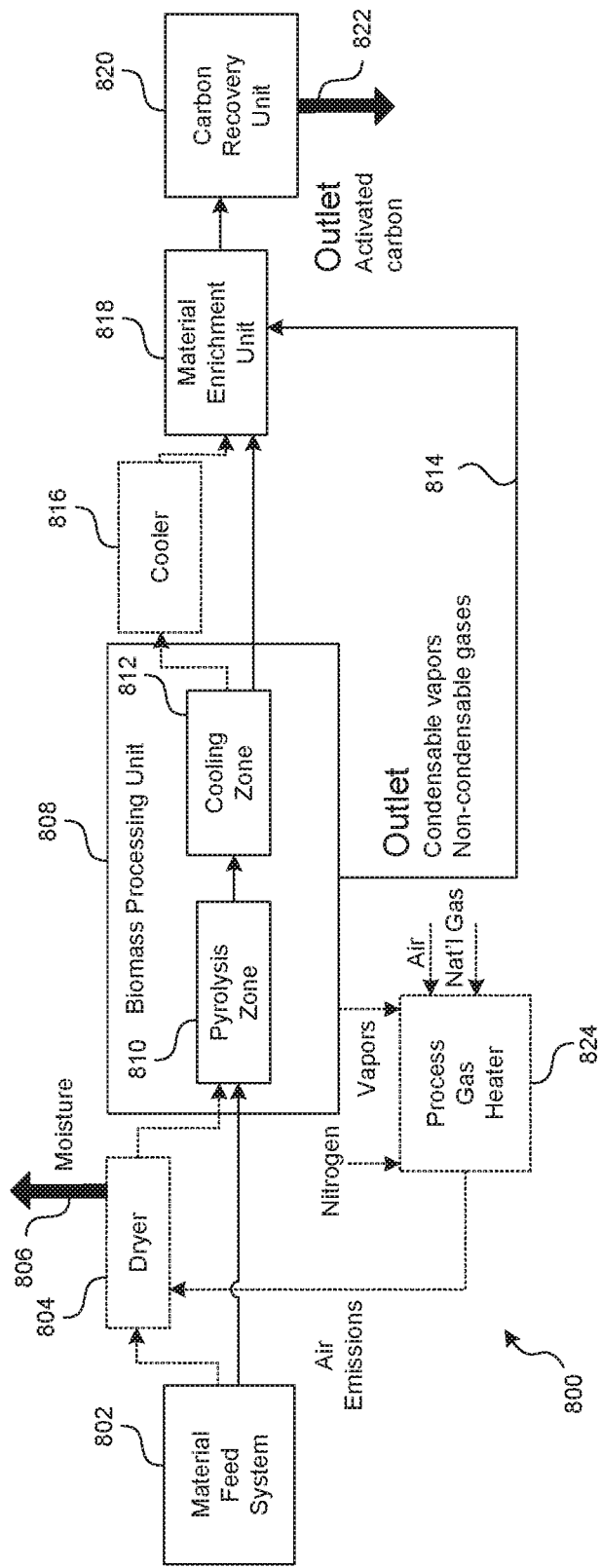
FIG. 8 depicts an embodiment of a single-reactor biomass processing unit of the invention with a gas inlet and an optional cooler.

Referring now to FIG. 8, a single-reactor, multiple zone BPU system 800 of one embodiment is illustrated and discussed. System 800 includes a material feed system 802, a BPU 808 having a pyrolysis zone 810 and a cooling zone 812, a material enrichment unit 818, and a carbon recovery unit 820. Similar to the embodiments discussed above, FIG. 8 also includes an optional dryer 804 located between the material feed system 802 and the BPU 808. It should be appreciated that moisture 806 from the dryer 804 is removed during the drying process. FIG. 8 also includes an optional cooler 816 outside of the BPU 808 and before the material enrichment unit 818. As discussed in more detail below, the material enrichment unit 818 is in communication with a gas outlet 814 of the BPU 808, which carries condensable vapors and non-condensable gases from the BPU. It should be appreciated that various embodiments illustrated in FIG. 8 include a separate carbon recovery unit 820 from the material enrichment unit 818. As discussed above, in various embodiments, the carbon recovery unit 820 of FIG. 8 is an appropriate vessel in which the enriched material is stored following the material enrichment unit 818, and the carbon recovery unit 820 does not further enrich the material.

It should be appreciated that, in various embodiments, an optional process gas heater 824 is disposed in the system and attached to the BPU 808. In various embodiments, vapors or other off-gases from the BPU 808 are inputted into the optional process gas heater 824, along with an external source of any one or more of air, natural gas, and nitrogen.

As discussed below, in various embodiments, the air emissions from the process gas heater 824 are inputted into dryer 804 as a heat or energy recovery system.

Figure 9:
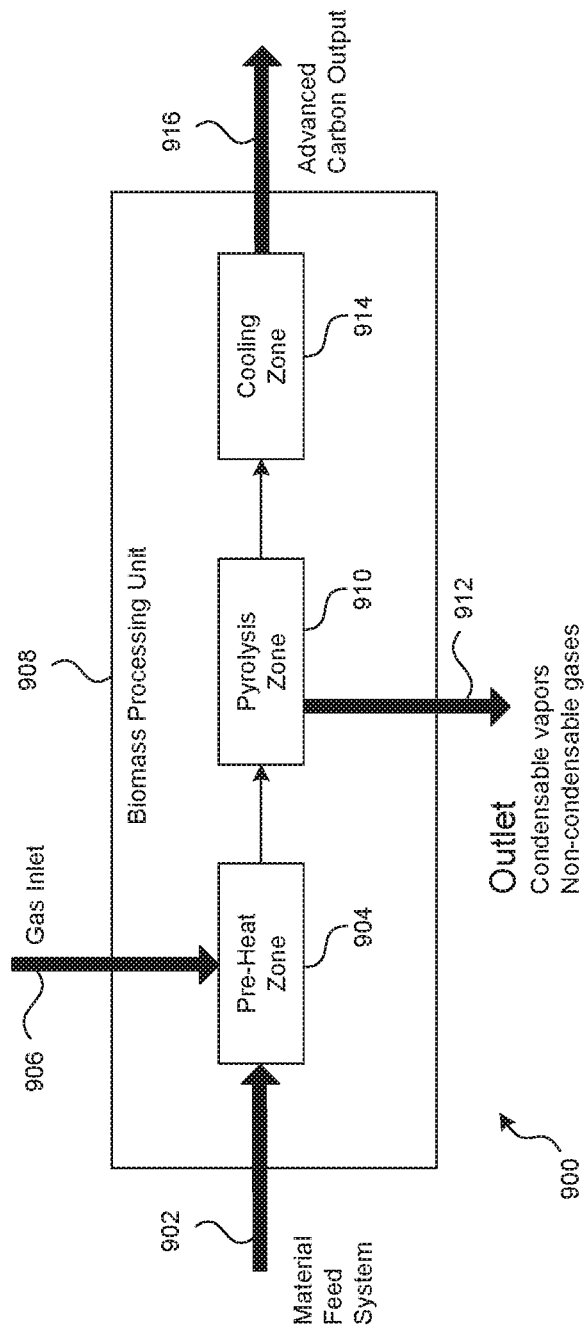
FIG. 9 depicts a single-reactor biomass processing unit system embodiment of the invention with an optional dryer and de-aerator, and an inert gas inlet.

Referring now to FIG. 9, a BPU 908 of a system 900 of one embodiment is illustrated and discussed. The BPU 908 includes a plurality of zones: the pre-heat zone 904, the pyrolysis zone 910, and the cooling zone 914. The BPU 908 of one embodiment also includes a material feed system 902 in communication with one of the zones at least one gas inlet 906 in communication with one or more of the zones 904, 910, 914. In various embodiments, as discussed below, one of the zones also includes at least one outlet 912 for outputting substances, in one embodiment, condensable vapors and/or non-condensable gases. In various embodiments, one of the zones also includes an outlet for outputting the advanced carbon from the system 900.

It should be appreciated that, although FIG. 9 shows the gas inlet 906 being connected to the pre-heat zone 904, various embodiments include inlets into any combination of the three zones. Similarly, it should be appreciated that although the gaseous outlet 912 comes from the pyrolysis zone 910, various embodiments include outlets out of one or more of any combination of the three zones. As discussed below, various embodiments contemplated include inputs and outputs within the BPU: e.g., an outlet of the pyrolysis zone 910 is then input into the pre-heat zone 904. It should be appreciated that, in the illustrated embodiment, each of the reactors in the BPU is connected to one another via the material feed system, as discussed above.

In various embodiments, the pre-heat zone 904 of the BPU 908 is configured for feeding biomass 902 (or another carbon-containing feedstock) in a manner that does not "shock" the biomass, which would rupture the cell walls and initiate fast decomposition of the solid phase into vapors and gases. In one embodiment, pre-heat zone 904 can be thought of as mild pyrolysis.

In various embodiments, pyrolysis zone 910 of the BPU 908 is configured as the primary reaction zone, in which preheated material undergoes pyrolysis chemistry to release gases and condensable vapors, resulting in a solid material which is a high-carbon reaction intermediate. Biomass components (primarily cellulose, hemicellulose, and lignin) decompose and create vapors, which escape by penetrating through pores or creating new nanopores. The latter effect contributes to the creation of porosity and surface area.

In various embodiments, the cooling zone 914 of the BPU 908 is configured for receiving the high-carbon reaction intermediate and cooling down the solids, i.e. the cooling zone 914 will be a lower temperature than the pyrolysis zone 910. In the cooling zone 914, the chemistry and mass transport can be complex. In various embodiments, secondary reactions occur in the cooling zone 914. It should be appreciated that carbon-containing components that are in the gas phase can decompose to form additional fixed carbon and/or become adsorbed onto the carbon. Thus, the advanced carbon 916 is not simply the solid, devolatilized residue of the processing steps, but rather includes additional carbon that has been deposited from the gas phase, such as by decomposition of organic vapors (e.g., tars) that can form carbon.

Figure 10:
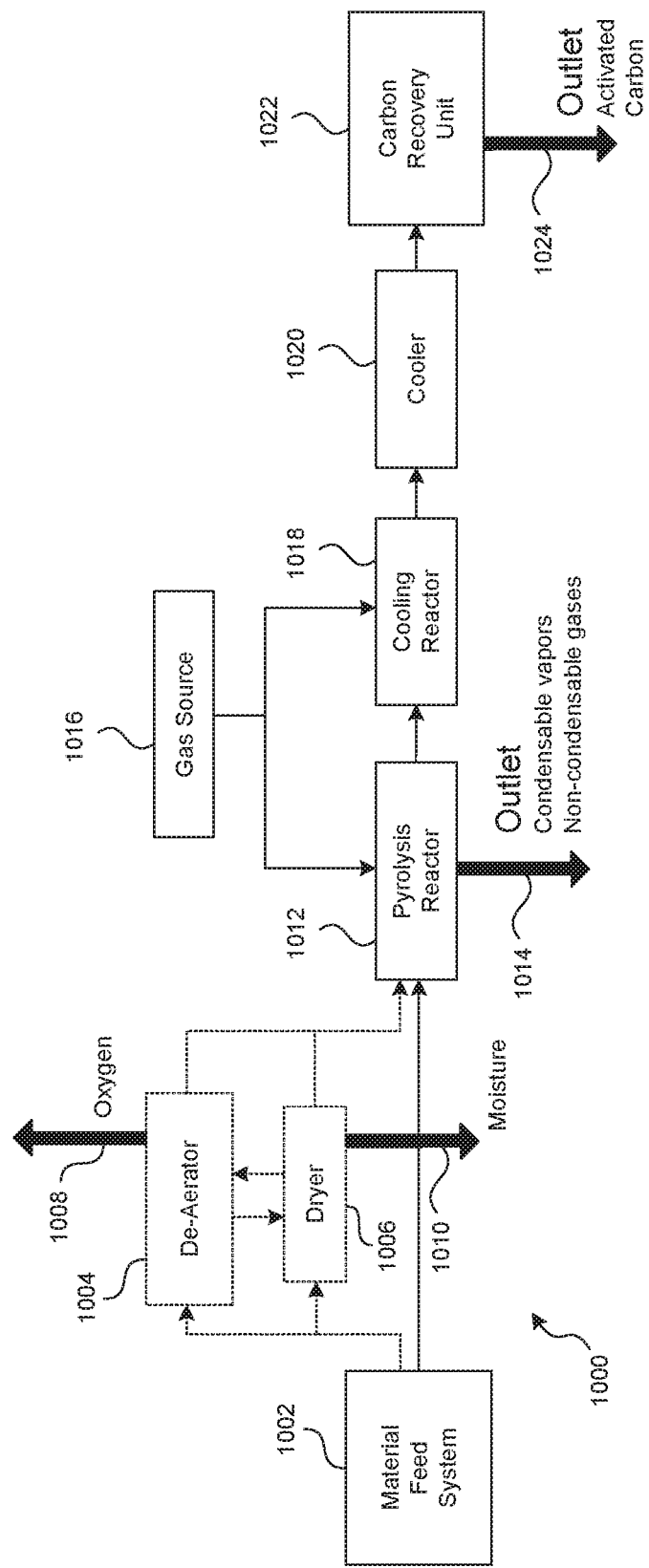
FIG. 10 depicts a multiple-reactor system embodiment of the invention with an optional dryer and de-aerator, and an inert gas inlet.

Referring now to FIGS. 10 to 13, various multiple reactor embodiments of the system are illustrated and discussed. Similar to each of the embodiments, the systems include an optional deaerator and an optional dryer, as discussed in more detail below. Referring to FIG. 10, the system 1000 includes material feed system 1002, a pyrolysis reactor 1012, a cooling reactor 1018, a cooler 1020 and a carbon recovery unit 1022. As discussed further below, a gas source 1016 is configured to input gas into one or both of the pyrolysis reactor 1012 and the cooling reactor 1018. In various embodiments, the pyrolysis reactor includes an outlet to output at least condensable vapors and/or non-condensable gases. In various embodiments, the carbon recovery unit 1022 includes an outlet 1024 to output porous carbon from the system 1000.

It should be appreciated that, in various embodiments illustrated at least in FIGS. 10 to 13, the illustrated systems include an optional de-aerator and an optional dryer. As seen in FIG. 10, for example, represented by broken lines, the optional de-aerator 1004 is connected to the system 1000 between the material feed system 1002 and the pyrolysis reactor 1002. Similarly, the dryer 1006 is connected to the system 1000 between the material feed system 1002 and the pyrolysis reactor 1012. In various embodiments, the dryer 1006 and deaerator 1004 are also connected to one another such that the material from the material feed system can follow any number of different paths through the material feed system, the de-aerator, the dryer, and to the pyrolysis reactor. It should be appreciated that in some embodiments, the material only passes through one of the optional de-aerator 1004 and dryer 1006.

In some embodiments, with reference to FIG. 10, a process for producing a high-carbon biogenic reagent comprises the following steps: providing a carbon-containing feedstock comprising biomass; optionally drying the feedstock to remove at least a portion of moisture contained within the feedstock; optionally deaerating the feedstock to remove at least a portion of interstitial oxygen, if any, contained with the feedstock; pyrolyzing the feedstock in the presence of a substantially inert gas phase for at least about 10 minutes and with at least one temperature selected from about 250° C. to about 700° C., to generate hot pyrolyzed solids, condensable vapors, and non-condensable gases; separating at least a portion of the condensable vapors and at least a portion of the non-condensable gases from the hot pyrolyzed solids; cooling the hot pyrolyzed solids to generate cooled pyrolyzed solids; and recovering a high-carbon biogenic reagent comprising at least a portion of the cooled pyrolyzed solids.

Figure 11:
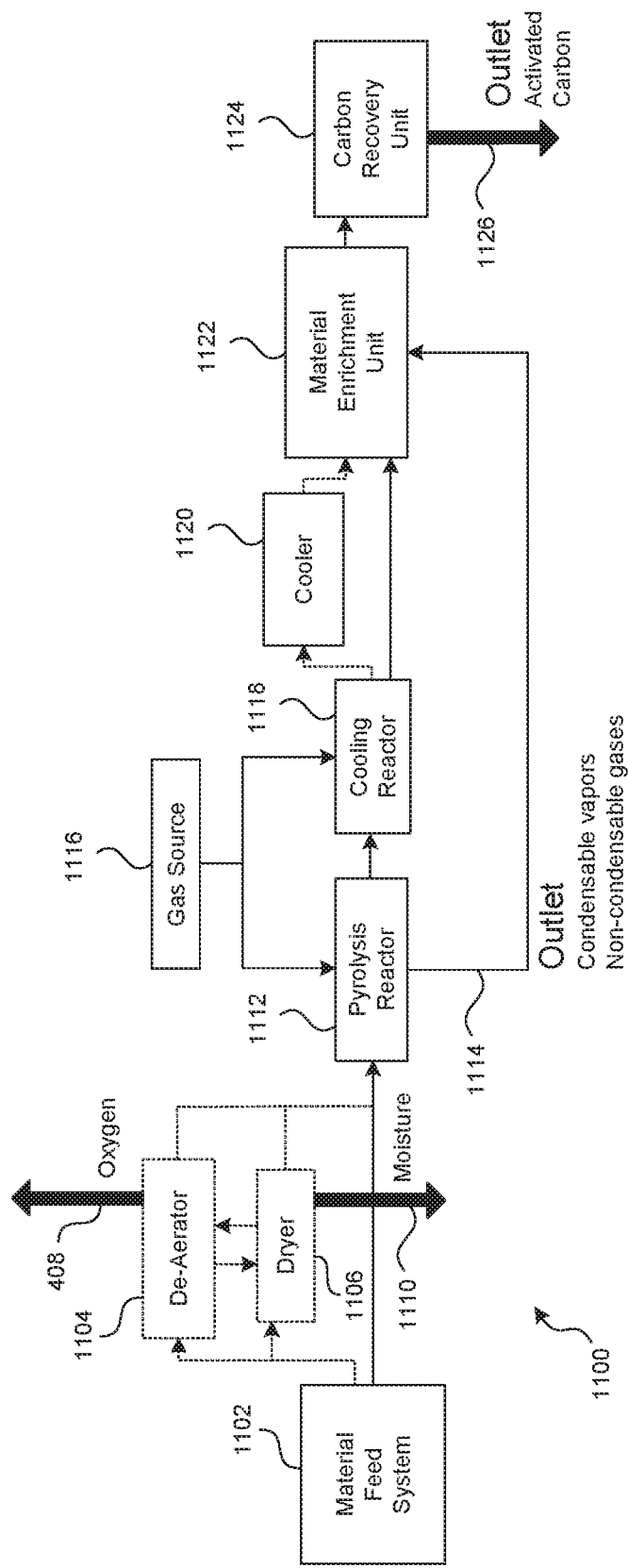
FIG. 11 depicts a multiple-reactor system embodiment of the invention with an optional dryer and cooler, and a material enrichment unit.
Figure 12:
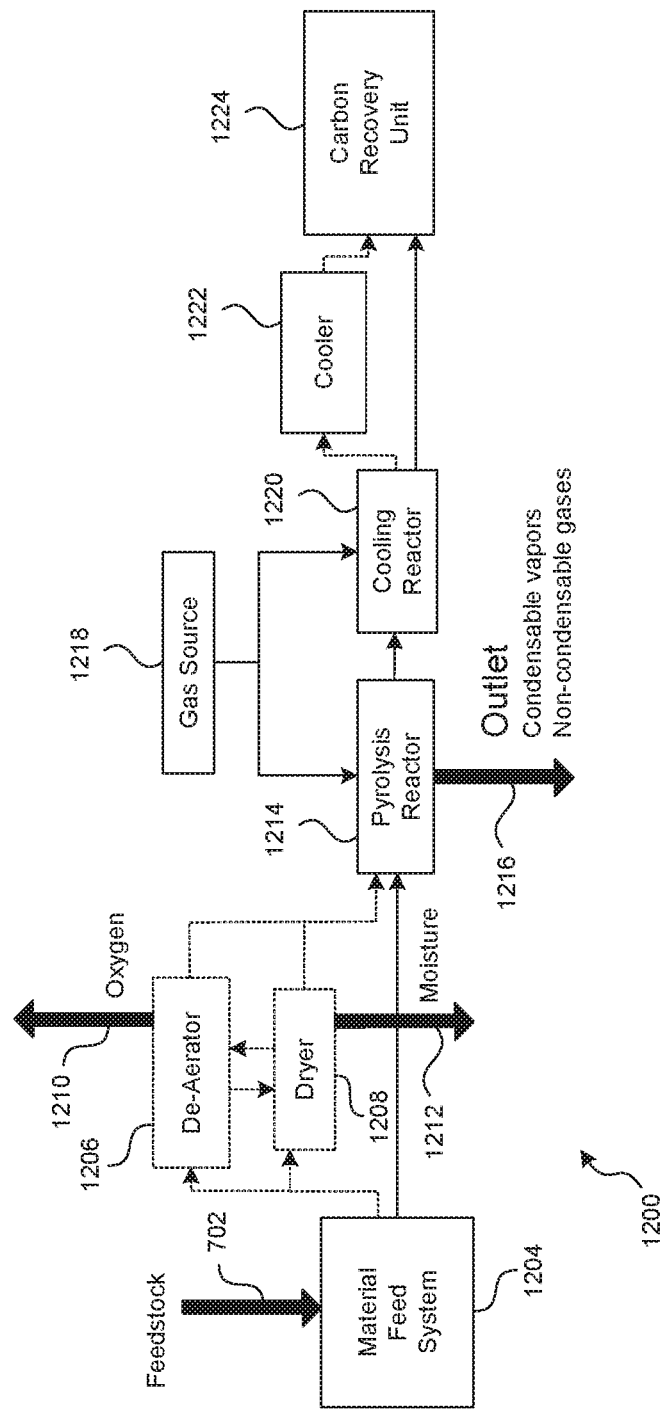
FIG. 12 depicts a multiple-reactor system embodiment of the invention with an optional dryer, de-aerator, a cooler, and an inert gas inlet.
Figure 13:
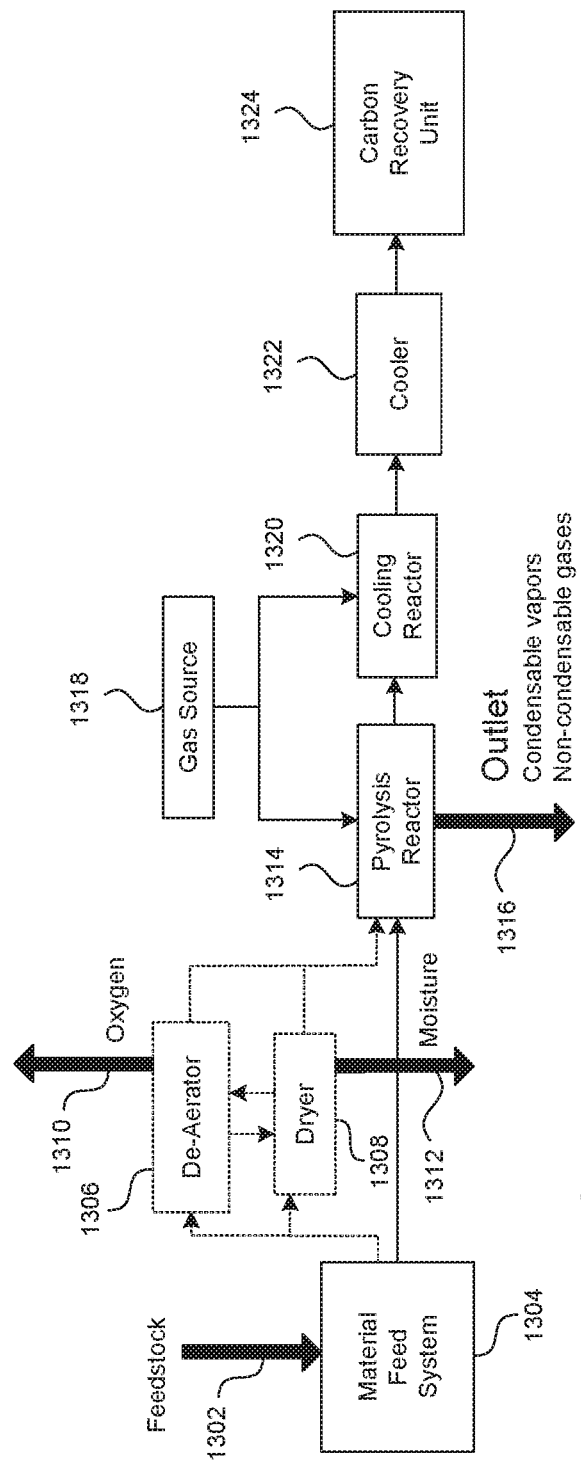
FIG. 13 depicts a multiple-reactor system embodiment of the invention with an optional dryer and de-aerator, an inert gas inlet, and a cooler.

Referring now to FIG. 11 a multiple reactor system 1100 of one embodiment is illustrated. Similar to the embodiment discussed above and illustrated in FIG. 10, this embodiment includes a material feed system 1102, pyrolysis reactor 1112, cooling reactor 1118, and carbon recovery unit 1124. In the illustrated embodiment of FIG. 11, the cooler 1120 is optional, and a material enrichment unit 1122 is disposed between the optional cooler 1120 and the carbon recovery unit 1124. It should be appreciated that, in various embodiments, the material enrichment unit 1122 enriches the material before it continues into the separate carbon recovery unit 1124, which may or may not further enrich the material. In various embodiments, an optional deaerator 1104 and an optional dryer 1106 are disposed between the material feed system 1102 and the pyrolysis reactor 1112. In the illustrated embodiment, the pyrolysis reactor 1112 also includes an outlet 1114 configured to remove substances such as condensable vapors and non-condensable gases and route the removed substances to the material enrichment unit 1122.

Various embodiments extend the concept of additional carbon formation by including a separate material enrichment unit 818, 1122 in which cooled carbon is subjected to an environment including carbon-containing species, to enrich the carbon content of the final product. When the temperature of this unit is below pyrolysis temperatures, the additional carbon is expected to be in the form of adsorbed carbonaceous species, rather than additional fixed carbon.

Figure 14:
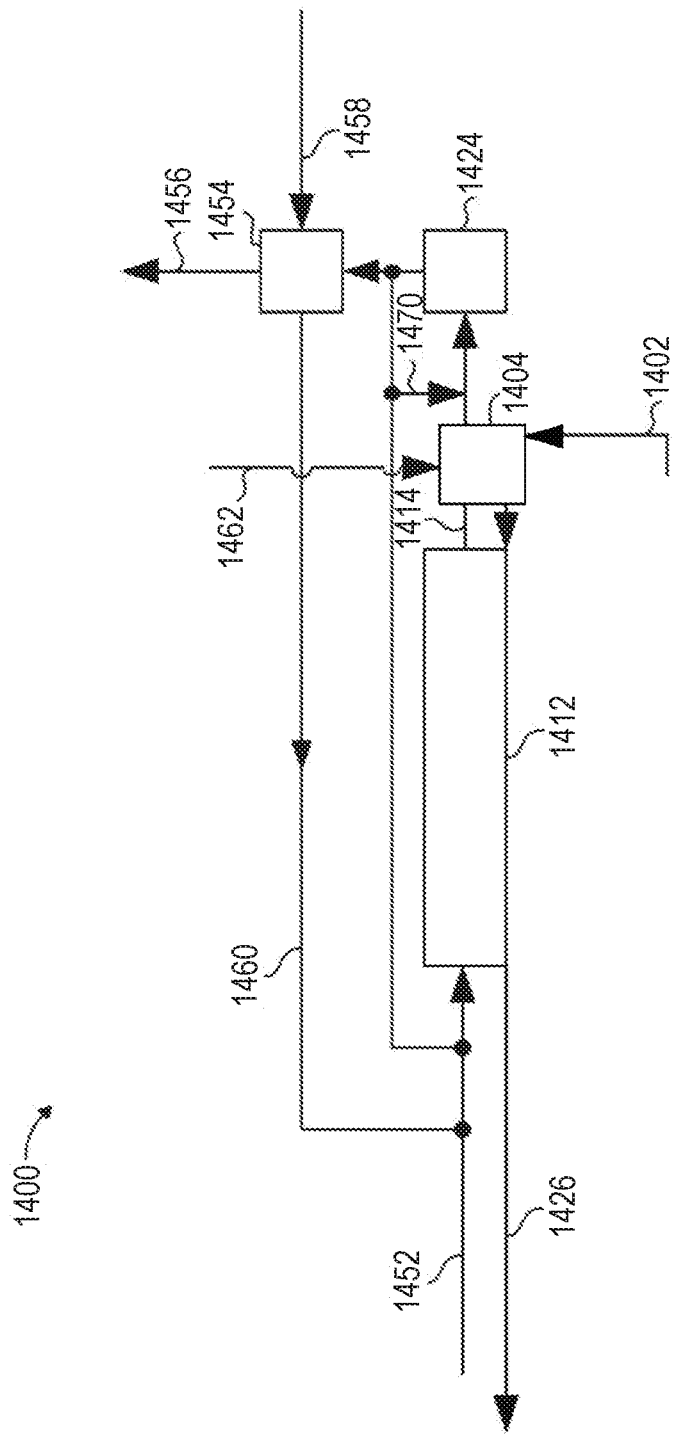
FIG. 14 depicts a single-reactor biomass processing unit embodiment of the disclosure for producing biogenic activated carbon.

Referring now to FIG. 14 a single-reactor biomass processing unit 1400 of one embodiment is illustrated. Unit 1400 comprises a hopper 1404 into which feedstock 1402 is fed. Hopper 1404 is optionally configured to enable addition and/or mixing of reactor off-gases (e.g., vapor stream 1414) and/or additives and/or gases from external sources 1462 to feedstock 1402 before conveying the feedstock 1402 to reactor 1412. Activated carbon 1426 is mechanically conveyed through reactor 1412 before exiting at the opposite end. Steam, nitrogen, carbon dioxide, or a combination thereof 1452 is introduced into reactor 1412 in a counter-current manner compared to the biomass path. Vapor stream 1414 is removed at least in part from the reactor 1412 and is optionally fed into hopper 1404, and then to a thermal oxidizer 1424. Heat exchanger 1454 enables heat from the emissions of the thermal oxidizer to heat gas stream 1458, which can comprise nitrogen and/or carbon dioxide. Gas stream 1458, or a portion thereof, is recycled via path 1460 to the reactor 1412, and/or optionally to the feedstock 1402 before entry into the reactor 1412 (not shown). Off-gases 1456 can be disposed of according to standard methods, for example through a stack.

Figure 15:
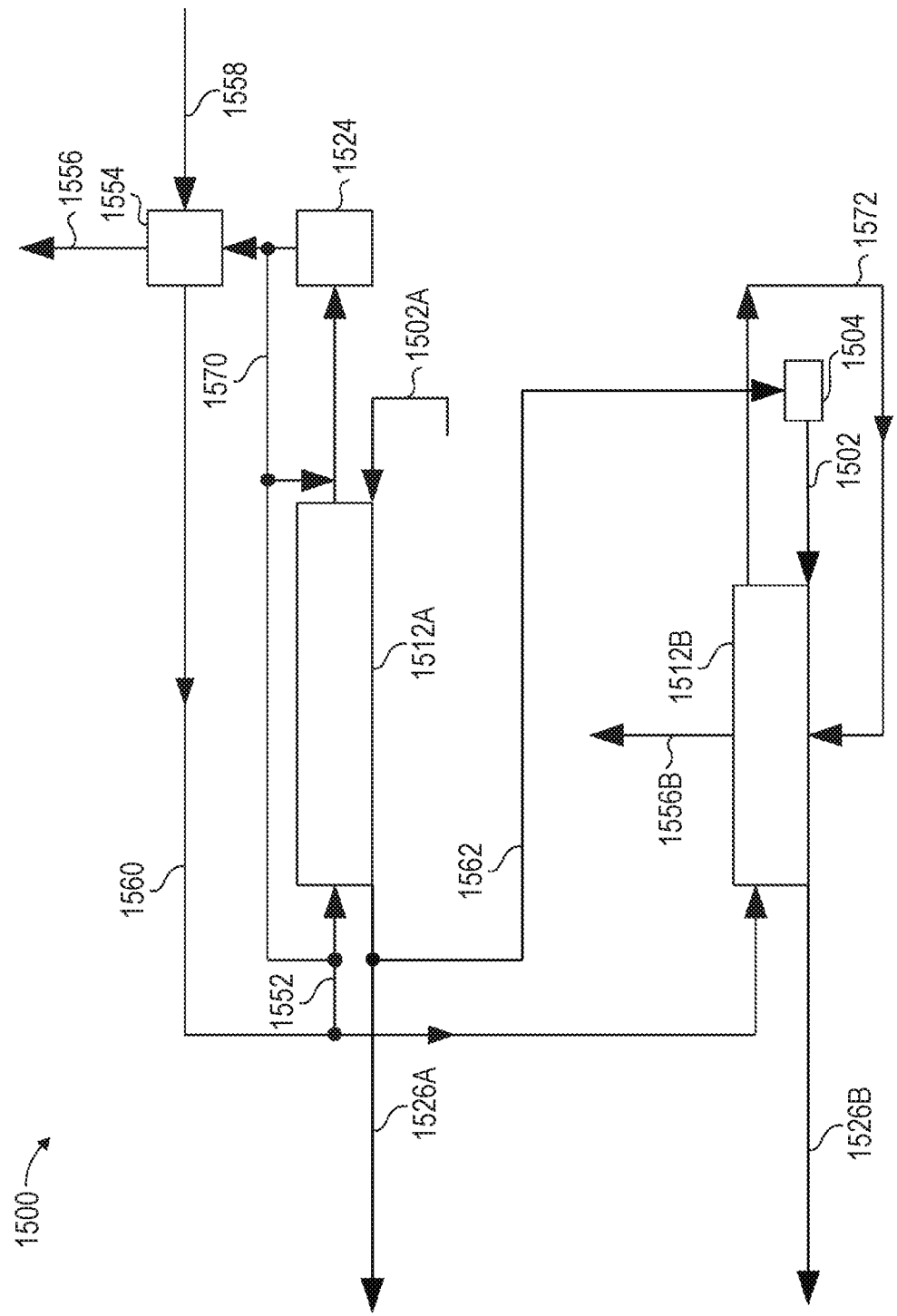
FIG. 15 depicts a two-reactor biomass processing unit embodiment of the disclosure for producing biogenic activated carbon.

Referring now to FIG. 15 a two-reactor biomass processing unit 1500 of one embodiment is illustrated. Unit 1500 comprises a first multizone reactor unit 1512A, configured substantially similarly to processing unit 1400 described above with respect to FIG. 14. In this embodiment, however, at least a portion of the biogenic activated carbon 1526A produced by reactor 1512A is fed into a hopper 1504 and then into second reactor 1512B via path 1502. At least a portion of the optionally thermally oxidized and optionally adjusted vapor stream 1560 produced by first reactor 1512A, thermal oxidizer 1524 and heat exchanger 1554 is fed countercurrently into second reactor 1512B. Optionally, at least a portion of the off-gases from second reactor 1512B are recycled via path 1572 to indirectly heat the second reactor 1512B. Alternatively, or in addition, portions of the off-gases that are not recycled as heat can be disposed of, for example by a stack, via path 1556B. Biogenic activated carbon product exits second reactor 1512B via path 1526B.

As will be described in detail below, there are a large number of options as to intermediate input and output (purge or probe) streams of one or more phases present in any particular reactor, various mass and energy recycle schemes, various additives that may be introduced anywhere in the process, adjustability of process conditions including both reaction and separation conditions in order to tailor product distributions, and so on. Zone or reactor-specific input and output streams enable good process monitoring and control, such as through FTIR sampling and dynamic process adjustments.

The present disclosure is different than fast pyrolysis, and it is different than conventional slow pyrolysis. High-quality carbon materials in the present disclosure, including compositions with high fractions of fixed carbon, may be obtained from the disclosed processes and systems.

Exemplary Uses

Silicon products can be produced using porous carbon and some form of silicon dioxide in a furnace. Generally, silicon dioxide that is introduced to silicon production furnaces needs to be relatively large (for example, tennis-ball sized). Both silica fume and raw silicon (river rock) are only capable of being used in a silicon production furnace when combined in a larger carbon rod which will allow the product to "sink" in the furnace toward the electrodes. The feedstock is basically river rock. There is a limited supply of river rock that is both of sufficient purity and of useful size. Disclosed herein are compositions that overcome this problem.

Surprisingly, the inventors have found that: (1) the compositions as described herein allow for the use of higher purity and/or smaller (and less expensive) sources of silicon dioxide than heretofore could be used in silicon production furnaces, for example electric arc furnaces and submerged arc furnaces; (2) the proximity of the carbon and silicon dioxide in the densified compositions result in more efficient conversion to silicon (therefore the closer proximity achieved through densification is a significant structural aspect); and (3) the compositions, because of their greater purity (greater purity is a significant structural aspect), improve the overall quality of any final silicon product produced using the compositions.

It is understood that the examples and embodiments described herein are for illustrative purposes only and are not intended to limit the scope of the claimed invention. It is also understood that various modifications or changes in light the examples and embodiments described herein will be suggested to persons skilled in the art and are to be included within the spirit and purview of this application and scope of the appended claims. All publications, patents, and patent applications cited herein are hereby incorporated by reference in their entirety for all purposes.

All publications, patents, and patent applications cited in this specification are herein incorporated by reference in their entirety as if each publication, patent, or patent application were specifically and individually put forth herein.

Where methods and steps described above indicate certain events occurring in certain order, those of ordinary skill in the art will recognize that the ordering of certain steps can be modified and that such modifications are in accordance with the variations of the disclosure. Additionally, certain of the steps can be performed concurrently in a parallel process when possible or performed sequentially.

Some variations of the disclosure are premised, at least in part, on the discovery that multiple reactors or multiple zones within a single reactor can be designed and operated in a way that optimizes carbon yield and product quality from pyrolysis, while maintaining flexibility and adjustability for feedstock variations and product requirements.

The above description should not be construed as limiting in any way as to the potential applications of the biogenic porous carbon. Injection of biogenic porous carbon into gas streams can be useful for control of contaminant emissions in gas streams or liquid streams derived from coal-fired power plants, biomass-fired power plants, metal processing plants, crude-oil refineries, chemical plants, polymer plants, pulp and paper plants, cement plants, waste incinerators, food processing plants, gasification plants, and syngas plants.

EXAMPLES

Example 1. Preparation of Silicon Dioxide Biogenic Porous Carbon Composition—General Method Woody biomass (red pine sawdust) was loaded into a hopper and conveyed optionally to a dryer where moisture in the wood was reduced below 15% and the biomass was then conveyed to a reactor system as described herein where the biomass was heated to approximately 650 degrees Celsius for approximately 30 minutes and activated with a gas stream comprised primarily of $CO_2$ and $H_2O$. Porous carbon was then discharged from the reactor and cooled with $N_2$ and $H_2O$ and conveyed to a mixer where 25% by weight of silicon dioxide was introduced and mixed with the porous carbon for approximately 5 minutes. The mixed silicon dioxide biogenic porous carbon composition was then conveyed to an extruder where it was extruded into pellets of approximately 0.25 inches×1 inch, which were then sent to dryer and dried to below approximately 8 percent moisture.

From the foregoing, it will be appreciated that specific embodiments of the invention have been described herein for purposes of illustration, but that various modifications may be made without deviating from the scope of the invention. Accordingly, the invention is not limited except as by the appended claims.

Para. A. A high-carbon biogenic reagent composition comprising, on a dry basis: at least about 50 wt % total carbon, at most about 5 wt % hydrogen, at most about 1 wt % nitrogen, at most about 0.5 wt % phosphorus, at most about 0.2 wt % sulfur, at most about 0.02 wt % titanium, at most about 0.5% calcium, at most about 0.1% aluminum, and silicon dioxide; wherein the total carbon comprises biogenic carbon.

Para. B. A high-carbon biogenic reagent composition comprising, on a dry basis: at least about 50 wt % total carbon, at most about 5 wt % hydrogen, at most about 1 wt % nitrogen, at most about 0.5 wt % phosphorus, at most about 0.2 wt % sulfur, at most about 0.02 wt % titanium, at most about 0.5% calcium, at most about 0.1% aluminum, and silicon dioxide; wherein the silicon dioxide is comprised within river rock; and wherein the total carbon comprises biogenic carbon.

Para. C. A high-carbon biogenic reagent composition comprising, on a dry basis: at least about 50 wt % total carbon, at most about 5 wt % hydrogen, at most about 1 wt % nitrogen, at most about 0.5 wt % phosphorus, at most about 0.2 wt % sulfur, at most about 0.02 wt % titanium, at most about 0.5% calcium, at most about 0.1% aluminum, and silicon dioxide; wherein the silicon dioxide is comprised within silica fume; and wherein the total carbon comprises biogenic carbon.

Para. D. The high-carbon biogenic reagent composition of Para. A, wherein the silicon dioxide is comprised within river rock.

Para. E. The high-carbon biogenic reagent composition of Para. A, wherein the silicon dioxide is comprised within silica fume.

Para. F. The high-carbon biogenic reagent composition of any one of Paras. A to E, comprising at least about 65 wt % total carbon.

Para. G. The high-carbon biogenic reagent composition of any one of Paras. A to F, comprising at least about 70 wt % total carbon.

Para. H. The high-carbon biogenic reagent composition of any one of Paras. A to G, comprising at least about 95 wt % total carbon.

Para. I. The high-carbon biogenic reagent composition of any one of Paras. A to H, comprising at least about 15 wt % silicon dioxide.

Para. J. The high-carbon biogenic reagent composition of any one of Paras. A to J, comprising at least about 25 wt % silicon dioxide.

Para. K. The high-carbon biogenic reagent composition of any one of Paras. A to J, comprising at least about 1 wt % silicon dioxide.

Para. L. The high-carbon biogenic reagent composition of any one of Paras. A to K, wherein the high-carbon biogenic reagent composition has been extruded.

Para. M. The high-carbon biogenic reagent composition of any one of Paras. A to L, wherein the high-carbon biogenic reagent composition has been densified.

Para. N. The high-carbon biogenic reagent composition of any one of Paras. A to M, wherein the high-carbon biogenic reagent composition is pellet shaped.

Para. O. The high-carbon biogenic reagent composition of any one of Paras. A to N, wherein the high-carbon biogenic reagent composition has dimensions of at least about 0.64 cm (0.25 in) by about 2.5 cm (1.0 in) to at most about 5.1 cm (2.0 in) by about 15 cm (6.0 in).

Para. P. The high-carbon biogenic reagent composition of any one of Paras. A to O, wherein the high-carbon biogenic reagent composition has a bulk density of about 560 to about 720 kg/m$^3$ (35 to 45 lb/ft$^3$).

Para. Q. The high-carbon biogenic reagent composition of any one of Paras. A to P, wherein the high-carbon biogenic reagent composition has an iodine number of at least about 300.

Para. R. A high-carbon biogenic reagent composition comprising, on a dry basis: at least about 50 wt % total carbon, at most about 5 wt % hydrogen, at most about 1 wt % nitrogen, at most about 0.5 wt % phosphorus, at most about 0.2 wt % sulfur, at most about 0.02 wt % titanium, at most about 0.5% calcium, at most about 0.1% aluminum, and at least about 15 wt % silicon dioxide; wherein the silicon dioxide is comprised within river rock; wherein the total carbon comprises biogenic carbon; and wherein the high-carbon biogenic reagent composition has been densified, is pellet shaped with dimensions of at least about 0.64 cm (0.25 in) by about 2.5 cm (1.0 in), and has a bulk density of about 560 to about 720 kg/m$^3$ (35 to 45 lb/ft$^3$).

Para. S. A high-carbon biogenic reagent composition comprising, on a dry basis: at least about 50 wt % total carbon, at most about 5 wt % hydrogen, at most about 1 wt % nitrogen, at most about 0.5 wt % phosphorus, at most about 0.2 wt % sulfur, at most about 0.02 wt % titanium, at most about 0.5% calcium, at most about 0.1% aluminum, and at least about 15 wt % silicon dioxide; wherein the silicon dioxide is comprised within silica fume; wherein the total carbon comprises biogenic carbon; and wherein the high-carbon biogenic reagent composition has been densified, is pellet shaped with dimensions of at least about 0.64 cm (0.25 in) by about 2.5 cm (1.0 in), and has a bulk density of about 560 to about 720 kg/m$^3$ (35 to 45 lb/ft$^3$).

Para. T. A process for producing a high-carbon biogenic reagent, said process comprising: providing a carbon-containing feedstock comprising dry biomass; in a preheating zone, preheating said feedstock in the presence of a substantially inert gas for at least about 5 minutes and with a preheating temperature selected from about 80° C. to about 500° C.; in a pyrolysis zone, pyrolyzing said feedstock in the presence of a substantially inert gas for at least about 10 minutes and with a pyrolysis temperature selected from about 250° C. to about 700° C., to generate hot pyrolyzed solids, condensable vapors, and non-condensable gases; separating at least a portion of said condensable vapors and at least a portion of said non-condensable gases from said hot pyrolyzed solids; in a cooling zone, cooling said hot pyrolyzed solids, in the presence of said substantially inert gas for at least about 5 minutes and with a cooling temperature less than said pyrolysis temperature, to generate warm pyrolyzed solids; in a cooler that is separate from said cooling zone, cooling said warm pyrolyzed solids to generate cool pyrolyzed solids; and recovering a high-carbon biogenic reagent comprising at least a portion of said cool pyrolyzed solids; wherein the process further comprises introducing silicon dioxide into said process.

Para. U. The process of Para. T, further comprising drying said feedstock to remove at least a portion of moisture, if any, contained within said feedstock prior to preheating said feedstock.

Para. V. The process of Para. T or U, further comprising deaerating said feedstock to remove at least a portion of molecular oxygen, if any, contained with said feedstock prior to preheating said feedstock.

Para. W. The process of any one of Paras. T to V, wherein introducing silicon dioxide comprises introducing silica fume.

Para X. The process of any one of Paras. T to W, wherein introducing silicon dioxide comprises introducing river rock.

Para. Y. The process of any one of Paras. T to X, further comprising densification.

Para. Z. The process of any one of Paras. T to Y, further comprising pressing, binding, pelletizing, extruding, or agglomerating the high-carbon biogenic reagent.

We claim:

1. A high-carbon biogenic reagent composition comprising, on a dry basis:
   at least about 50 wt % total carbon,
   at most about 5 wt % hydrogen,
   at most about 1 wt % nitrogen,
   at most about 0.5 wt % phosphorus,
   at most about 0.2 wt % sulfur,
   at most about 0.02 wt % titanium,
   at most about 0.5% calcium,
   at most about 0.1% aluminum, and
   silicon dioxide;
   wherein the total carbon comprises biogenic carbon;
   wherein the silicon dioxide is comprised within river rock
   or
   wherein the silicon dioxide is comprised within silica fume.

2. The high-carbon biogenic reagent composition of claim 1, comprising at least about 65 wt % total carbon.

3. The high-carbon biogenic reagent composition of claim 1, comprising at least about 95 wt % total carbon.

4. The high-carbon biogenic reagent composition of claim 1, comprising at least about 15 wt % silicon dioxide.

5. The high-carbon biogenic reagent composition of claim 1, comprising at least about 25 wt % silicon dioxide.

6. The high-carbon biogenic reagent composition of claim 1, comprising at least about 1 wt % silicon dioxide.

7. The high-carbon biogenic reagent composition of claim 1, wherein the high-carbon biogenic reagent composition has been extruded.

8. The high-carbon biogenic reagent composition of claim 1, wherein the high-carbon biogenic reagent composition has been densified.

9. The high-carbon biogenic reagent composition of claim 1, wherein the high-carbon biogenic reagent composition is pellet shaped.

10. The high-carbon biogenic reagent composition of claim 1, wherein the high-carbon biogenic reagent composition has dimensions of at least about 0.64 cm (0.25 in) by about 2.5 cm (1.0 in) to at most about 5.1 cm (2.0 in) by about 15 cm (6.0 in).

11. The high-carbon biogenic reagent composition of claim 1, wherein the composition has a bulk density of about 560 to about 720 kg/m$^3$ (35 to 45 lb/ft$^3$).

12. The high-carbon biogenic reagent composition of claim 1, wherein the high-carbon biogenic reagent composition has an iodine number of at least about 300.

13. The high-carbon biogenic reagent composition of claim 1, comprising:
- at least about 50 wt % total carbon,
- at most about 5 wt % hydrogen,
- at most about 1 wt % nitrogen,
- at most about 0.5 wt % phosphorus,
- at most about 0.2 wt % sulfur,
- at most about 0.02 wt % titanium,
- at most about 0.5% calcium,
- at most about 0.1% aluminum, and
- at least about 15 wt % silicon dioxide;
- wherein the silicon dioxide is comprised within river rock;
- wherein the total carbon comprises biogenic carbon;
- and wherein the high-carbon biogenic reagent composition has been densified, is pellet shaped with dimensions of at least about 0.64 cm (0.25 in) by about 2.5 cm (1.0 in), and has a bulk density of about 560 to about 720 kg/m$^3$ (35 to 45 lb/ft$^3$).

14. The high-carbon biogenic reagent composition of claim 1, comprising:
- at least about 50 wt % total carbon,
- at most about 5 wt % hydrogen,
- at most about 1 wt % nitrogen,
- at most about 0.5 wt % phosphorus,
- at most about 0.2 wt % sulfur,
- at most about 0.02 wt % titanium,
- at most about 0.5% calcium,
- at most about 0.1% aluminum, and
- at least about 15 wt % silicon dioxide;
- wherein the silicon dioxide is comprised within silica fume;
- wherein the total carbon comprises biogenic carbon;
- and wherein the high-carbon biogenic reagent composition has been densified, is pellet shaped with dimensions of at least about 0.64 cm (0.25 in) by about 2.5 cm (1.0 in), and has a bulk density of about 560 to about 720 kg/m$^3$ (35 to 45 lb/ft$^3$).

\* \* \* \* \*